US011551257B2

(12) United States Patent
Goldman et al.

(10) Patent No.: US 11,551,257 B2
(45) Date of Patent: Jan. 10, 2023

(54) DIGITAL MEDIA ENVIRONMENT FOR ANALYSIS OF AUDIENCE SEGMENTS IN A DIGITAL MARKETING CAMPAIGN

(71) Applicant: Adobe Inc., San Jose, CA (US)

(72) Inventors: Oliver Isaac Goldman, Seattle, WA (US); Thomas William Randall Jacobs, Cupertino, CA (US); Kent Andrew Edmonds, San Jose, CA (US); Kevin Gary Smith, Lehi, UT (US); Pradeep Saikalyanachakravarthi Javangula, San Jose, CA (US); Ashley Manning Still, Atherton, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/782,517

(22) Filed: Oct. 12, 2017

(65) Prior Publication Data
US 2019/0114664 A1    Apr. 18, 2019

(51) Int. Cl.
G06Q 30/00    (2012.01)
G06Q 30/02    (2012.01)

(52) U.S. Cl.
CPC ..... *G06Q 30/0244* (2013.01); *G06Q 30/0246* (2013.01); *G06Q 30/0276* (2013.01); *G06Q 30/0277* (2013.01)

(58) Field of Classification Search
CPC .......... G06Q 30/0246; G06Q 30/0244; G06Q 30/0276; G06Q 30/0277
See application file for complete search history.

(56) References Cited

U.S. PATENT DOCUMENTS

| 6,922,699 B2 | 7/2005 | Schuetze et al. |
| 7,240,077 B1 | 7/2007 | Edelman et al. |

(Continued)

FOREIGN PATENT DOCUMENTS

WO    WO-2015027223    2/2015

OTHER PUBLICATIONS

U. Shakeel and M. Limcaco, "Leveraging Cloud-Based Predictive Analytics to Strengthen Audience Engagement," in SMPTE Motion Imaging Journal, vol. 125, No. 8, pp. 60-68, Oct. 2016, doi: 10.5594/JMI.2016.2602121. (Year: 2016).*

(Continued)

*Primary Examiner* — Sun M Li
(74) *Attorney, Agent, or Firm* — FIG. 1 Patents

(57) ABSTRACT

Techniques and systems are described to enable users to optimize a digital marketing content system by analyzing an effect of components of digital marketing content on audience segments, environments of consumption, and channels of consumption. A computing device of an analytics system receives user interaction data describing an effect of user interaction with multiple items of digital marketing content on achieving an action for multiple audience segments. The analytics system identifies which of a plurality of components are included in respective items of digital marketing content. The analytics system generates data identifying different aspects that likely had an effect on the achieving an action on the items of digital marketing content, such as components of the items of digital marketing content, environments of consumption, channels of consumption. The analytics system outputs a result based on the data in a user interface.

20 Claims, 11 Drawing Sheets

(56) References Cited

U.S. PATENT DOCUMENTS

| | | |
|---|---|---|
| 7,882,045 B1 | 2/2011 | Cole et al. |
| 7,890,571 B1 | 2/2011 | Kriegsman et al. |
| 8,005,837 B2 | 8/2011 | Lee et al. |
| 8,442,683 B2 | 5/2013 | Lee |
| 8,566,712 B1 | 10/2013 | Varian |
| 8,626,718 B2 | 1/2014 | Rozensztejn et al. |
| 8,752,112 B2 | 6/2014 | Krasic et al. |
| 9,055,124 B1 | 6/2015 | Hill |
| 9,117,227 B1 | 8/2015 | Agrawal et al. |
| 9,134,978 B1 | 9/2015 | Roskind |
| 9,152,624 B1 | 10/2015 | Krallman et al. |
| 9,367,524 B1 | 6/2016 | Filev et al. |
| 9,396,483 B2 | 7/2016 | Hamedi |
| 9,554,093 B2 | 1/2017 | Hua et al. |
| 9,646,227 B2 | 5/2017 | Suri et al. |
| 9,736,503 B1 | 8/2017 | Bakshi et al. |
| 9,811,590 B1 | 11/2017 | Acharya et al. |
| 9,904,949 B1 | 2/2018 | Tavernier |
| 9,923,860 B2 | 3/2018 | Krishnaswamy et al. |
| 10,163,173 B1 | 12/2018 | McKinley et al. |
| 10,339,173 B2 | 7/2019 | Kelley et al. |
| 10,341,199 B2 | 7/2019 | Peri et al. |
| 10,600,075 B2 | 3/2020 | Fabbri et al. |
| 10,657,118 B2 | 5/2020 | Miller et al. |
| 10,685,375 B2 | 6/2020 | Goldman et al. |
| 10,733,262 B2 | 8/2020 | Miller et al. |
| 10,795,647 B2 | 10/2020 | Jacobs et al. |
| 10,853,766 B2 | 12/2020 | Balakrishnan et al. |
| 10,943,257 B2 | 3/2021 | Goldman et al. |
| 11,243,747 B2 | 2/2022 | Jacobs et al. |
| 2001/0035873 A1 | 11/2001 | Easter |
| 2002/0107926 A1 | 8/2002 | Lee |
| 2002/0150295 A1 | 10/2002 | Kwok et al. |
| 2004/0133081 A1 | 7/2004 | Teller et al. |
| 2004/0183830 A1* | 9/2004 | Cody .......... G06Q 10/107 715/747 |
| 2005/0002586 A1 | 1/2005 | Liege et al. |
| 2005/0033657 A1 | 2/2005 | Herrington et al. |
| 2006/0048092 A1 | 3/2006 | Kirkley |
| 2006/0080314 A1 | 4/2006 | Hubert et al. |
| 2006/0085255 A1 | 4/2006 | Hastings et al. |
| 2007/0033093 A1 | 2/2007 | Divine et al. |
| 2007/0250901 A1 | 10/2007 | McIntire |
| 2008/0040318 A1 | 2/2008 | Stanis et al. |
| 2008/0120646 A1 | 5/2008 | Stern et al. |
| 2008/0215509 A1 | 9/2008 | Charlton |
| 2008/0249855 A1 | 10/2008 | Collins et al. |
| 2009/0006467 A1 | 1/2009 | Visscher |
| 2009/0066641 A1 | 3/2009 | Mahajan et al. |
| 2009/0079871 A1 | 3/2009 | Hua et al. |
| 2009/0092374 A1 | 4/2009 | Kulas |
| 2009/0144129 A1 | 6/2009 | Grout et al. |
| 2010/0017885 A1 | 1/2010 | Cohen et al. |
| 2010/0023393 A1 | 1/2010 | Costy |
| 2010/0050098 A1 | 2/2010 | Turner |
| 2010/0118035 A1 | 5/2010 | Yamakami |
| 2010/0120402 A1 | 5/2010 | Sethi et al. |
| 2010/0161717 A1 | 6/2010 | Albrecht et al. |
| 2011/0040611 A1 | 2/2011 | Simmons et al. |
| 2011/0153414 A1 | 6/2011 | Elvekrog et al. |
| 2011/0239253 A1 | 9/2011 | West et al. |
| 2011/0258036 A1 | 10/2011 | Ioffe et al. |
| 2011/0320441 A1 | 12/2011 | Lee et al. |
| 2012/0054596 A1 | 3/2012 | Kroger et al. |
| 2012/0109609 A1 | 5/2012 | Weber et al. |
| 2012/0116868 A1 | 5/2012 | Chin et al. |
| 2012/0130802 A1 | 5/2012 | Shimizu |
| 2012/0272160 A1 | 10/2012 | Spivack et al. |
| 2013/0073388 A1* | 3/2013 | Heath .......... G06Q 50/01 705/14.53 |
| 2013/0124298 A1 | 5/2013 | Li et al. |
| 2013/0159110 A1 | 6/2013 | Rajaram et al. |
| 2013/0304604 A1 | 11/2013 | Hoffman et al. |
| 2013/0346347 A1 | 12/2013 | Patterson et al. |
| 2014/0040067 A1 | 2/2014 | England et al. |
| 2014/0046777 A1 | 2/2014 | Markey et al. |
| 2014/0047335 A1 | 2/2014 | Lewis et al. |
| 2014/0114746 A1 | 4/2014 | Pani et al. |
| 2014/0130076 A1* | 5/2014 | Moore .......... H04N 21/251 725/19 |
| 2014/0156379 A1 | 6/2014 | Pani et al. |
| 2014/0156416 A1 | 6/2014 | Goenka et al. |
| 2014/0200989 A1 | 7/2014 | Cohen Kassko et al. |
| 2014/0324604 A1 | 10/2014 | Torres et al. |
| 2014/0372901 A1 | 12/2014 | Catlin et al. |
| 2015/0006295 A1 | 1/2015 | Liu et al. |
| 2015/0100377 A1 | 4/2015 | Penumaka et al. |
| 2015/0112980 A1 | 4/2015 | Sanio et al. |
| 2015/0149281 A1 | 5/2015 | Carrotte et al. |
| 2015/0161648 A1* | 6/2015 | Heath .......... G06Q 50/01 705/14.36 |
| 2015/0324867 A1 | 11/2015 | Jalili |
| 2015/0379557 A1 | 12/2015 | Liu et al. |
| 2016/0007083 A1* | 1/2016 | Gurha .......... H04N 21/252 725/13 |
| 2016/0019243 A1 | 1/2016 | Kamel et al. |
| 2016/0071162 A1 | 3/2016 | Ogawa et al. |
| 2016/0078520 A1 | 3/2016 | Nice et al. |
| 2016/0086215 A1 | 3/2016 | Wang et al. |
| 2016/0189201 A1 | 6/2016 | Shao |
| 2016/0286244 A1 | 9/2016 | Chang et al. |
| 2016/0300135 A1 | 10/2016 | Moudy et al. |
| 2016/0335339 A1 | 11/2016 | Venkataraman et al. |
| 2016/0379244 A1 | 12/2016 | Kalish et al. |
| 2017/0017986 A1 | 1/2017 | Mathis et al. |
| 2017/0032483 A1 | 2/2017 | Steelberg et al. |
| 2017/0061500 A1 | 3/2017 | Borodin |
| 2017/0078350 A1 | 3/2017 | Gordon |
| 2017/0098236 A1 | 4/2017 | Lee et al. |
| 2017/0099525 A1 | 4/2017 | Ray et al. |
| 2017/0140249 A1 | 5/2017 | Lee et al. |
| 2017/0140283 A1 | 5/2017 | Cheng et al. |
| 2017/0149852 A1 | 5/2017 | Selekman et al. |
| 2017/0161773 A1 | 6/2017 | Xu et al. |
| 2017/0161794 A1 | 6/2017 | Zhu et al. |
| 2017/0220694 A1 | 8/2017 | Vaish et al. |
| 2017/0270600 A1* | 9/2017 | Duponchel .......... G06Q 30/0255 |
| 2017/0337234 A1 | 11/2017 | Goldman et al. |
| 2018/0004847 A1 | 1/2018 | Kulkarni et al. |
| 2018/0012253 A1 | 1/2018 | Gavlovski et al. |
| 2018/0040019 A1 | 2/2018 | Gavlovski et al. |
| 2018/0040029 A1 | 2/2018 | Zeng et al. |
| 2018/0060921 A1 | 3/2018 | Mengle et al. |
| 2018/0101611 A1* | 4/2018 | McDevitt .......... G06F 16/735 |
| 2018/0101774 A1 | 4/2018 | Werris |
| 2018/0109612 A1 | 4/2018 | Zhong et al. |
| 2018/0181375 A1 | 6/2018 | Hermet-Chavanne et al. |
| 2018/0189074 A1 | 7/2018 | Kulkarni et al. |
| 2018/0189822 A1 | 7/2018 | Kulkarni et al. |
| 2018/0189843 A1 | 7/2018 | Kulkarni et al. |
| 2018/0225705 A1* | 8/2018 | Ferber .......... G06F 16/9535 |
| 2018/0240152 A1 | 8/2018 | Mookherjee et al. |
| 2018/0276720 A1 | 9/2018 | Yang et al. |
| 2018/0300046 A1 | 10/2018 | Goyal et al. |
| 2019/0034809 A1 | 1/2019 | Xu et al. |
| 2019/0034976 A1 | 1/2019 | Hamedi et al. |
| 2019/0050456 A1 | 2/2019 | Gupta et al. |
| 2019/0080019 A1 | 3/2019 | Young et al. |
| 2019/0080347 A1 | 3/2019 | Smith |
| 2019/0086988 A1 | 3/2019 | He et al. |
| 2019/0095945 A1 | 3/2019 | Fabbri et al. |
| 2019/0095949 A1 | 3/2019 | Chien et al. |
| 2019/0108250 A1 | 4/2019 | Miller et al. |
| 2019/0108288 A1 | 4/2019 | Miller et al. |
| 2019/0114151 A1 | 4/2019 | Jacobs et al. |
| 2019/0114663 A1 | 4/2019 | Goldman et al. |
| 2019/0114672 A1 | 4/2019 | Jacobs et al. |
| 2019/0114680 A1 | 4/2019 | Chien et al. |
| 2019/0130356 A1 | 5/2019 | Balakrishnan et al. |
| 2019/0130458 A1 | 5/2019 | Balakrishnan et al. |
| 2019/0164082 A1 | 5/2019 | Wu |
| 2019/0205919 A1 | 7/2019 | Goksel et al. |
| 2019/0279260 A1 | 9/2019 | Carpita et al. |
| 2020/0021873 A1 | 1/2020 | Swaminathan et al. |

(56) References Cited

U.S. PATENT DOCUMENTS

| | | |
|---|---|---|
| 2020/0218709 A1 | 7/2020 | Miller |
| 2020/0265463 A1 | 8/2020 | Goldman et al. |
| 2020/0401380 A1 | 12/2020 | Jacobs et al. |
| 2022/0019412 A1 | 1/2022 | Jacobs et al. |

OTHER PUBLICATIONS

T. Orton, G. Cao and M. Oussalah, "Personalized content based image retrieval," 2008 7th IEEE International Conference on Cybernetic Intelligent Systems, 2008, pp. 1-6, doi: 10.1109/UKRICIS.2008.4798945. (Year: 2008).*
H. -W. Sehring, "Adaptive Content Visualization in Concept-Oriented Content Management Systems," 2009 Computation World: Future Computing, Service Computation, Cognitive, Adaptive, Content, Patterns, 2009, pp. 659-664, doi: 10.1109/ComputationWorld.2009.71. (Year: 2009).*
"Final Office Action", U.S. Appl. No. 15/783,228, dated Oct. 24, 2019, 23 pages.
"Pre-Interview First Office Action", U.S. Appl. No. 15/713,339, dated Aug. 8, 2019, 3 pages.
"Non-Final Office Action", U.S. Appl. No. 15/785,298, dated Sep. 14, 2018, 17 pages.
"Restriction Requirement", U.S. Appl. No. 15/785,298, dated Jul. 19, 2018, 7 pages.
"Pre-Interview First Office Action", U.S. Appl. No. 15/716,348, dated Jan. 29, 2019, 3 pages.
"First Action Interview Office Action", U.S. Appl. No. 15/716,348, dated Feb. 20, 2019, 3 pages.
"Pre-Interview First Office Action", U.S. Appl. No. 15/726,168, dated Mar. 19, 2019, 7 pages.
"Final Office Action", U.S. Appl. No. 15/716,348, dated Jul. 23, 2019, 25 pages.
"Final Office Action", U.S. Appl. No. 15/726,125, dated Sep. 13, 2019, 11 pages.
"First Action Interview Office Action", U.S. Appl. No. 15/726,168, dated Jun. 28, 2019, 6 pages.
"First Action Interview Office Action", U.S. Appl. No. 15/783,228, dated Aug. 22, 2019, 8 pages.
"Pre-Interview First Office Action", U.S. Appl. No. 15/726,125, dated Jul. 11, 2109, 7 pages.
"Pre-Interview First Office Action", U.S. Appl. No. 15/782,457, dated Sep. 11, 2019, 4 pages.
"Pre-Interview First Office Action", U.S. Appl. No. 15/783,228, dated Jul. 8, 2019, 8 pages.
Foley,"How to Get WordPress Rotating Header Images", Apr. 19, 2013, 14 pages.
Forrest,"How Google wants to crowdsource machine learning with smartphones and Federated Learning", Retrieved at: https://www.techrepublic.com/article/how-google-wants-to-crowdsource-machine-learning-with-smartphones-and-federated-learning/, Apr. 7, 2017, 10 pages.
McMahan,"Communication-Efficient Learning of Deep Networks from Decentralized Data", Proceedings of the 20 the International Conference on Artificial Intelligence and Statistics (AISTATS) 2017. JMLR: W&CP vol. 54, Feb. 28, 2017, 11 pages.
"Final Office Action", U.S. Appl. No. 15/785,298, dated Apr. 17, 2019, 24 pages.
"Pre-Interview First Office Action", U.S. Appl. No. 15/785,298, dated Sep. 21, 2018, 4 pages.
"First Action Interview Office Action", U.S. Appl. No. 15/785,298, dated Oct. 1, 2018, 4 pages.
"Corrected Notice of Allowability", U.S. Appl. No. 15/726,125, dated Mar. 18, 2020, 2 pages.
"Global Unique Identifier", Tech Terms, Retrieved at: https://techterms.com/definition/guid, Oct. 13, 2008, 1 page.
"Non-Final Office Action", U.S. Appl. No. 15/716,348, dated Mar. 25, 2020, 26 pages.
"Non-Final Office Action", U.S. Appl. No. 15/801,090, dated Mar. 10, 2020, 26 pages.
"Non-Final Office Action", U.S. Appl. No. 15/801,173, dated Mar. 31, 2020, 26 pages.
"Notice of Allowance", U.S. Appl. No. 15/726,168, dated Mar. 26, 2020, 9 pages.
"Notice of Allowance", U.S. Appl. No. 15/782,457, dated Feb. 7, 2020, 14 pages.
"Pre-Interview First Office Action", U.S. Appl. No. 15/801,090, dated Mar. 16, 2020, 5 pages.
"Final Office Action", U.S. Appl. No. 15/726,168, dated Dec. 11, 2019, 11 pages.
"First Action Interview Office Action", U.S. Appl. No. 15/782,457, dated Oct. 29, 2019, 3 pages.
"Non-Final Office Action", U.S. Appl. No. 15/785,298, dated Dec. 9, 2019, 11 pages.
"Non-Final Office Action", U.S. Appl. No. 15/801,173, dated Oct. 30, 2019, 22 pages.
"Notice of Allowance", U.S. Appl. No. 15/713,339, dated Nov. 25, 2019, 13 pages.
"Notice of Allowance", U.S. Appl. No. 15/726,125, dated Jan. 8, 2020, 8 pages.
"Pre-Interview First Office Action", U.S. Appl. No. 15/801,173, dated Dec. 2, 2019, 4 pages.
"Corrected Notice of Allowability", U.S. Appl. No. 15/785,298, dated Aug. 27, 2020, 2 pages.
"Corrected Notice of Allowability", U.S. Appl. No. 15/785,298, dated Sep. 10, 2020, 2 pages.
"Examiner's Answer", U.S. Appl. No. 15/783,228, dated Sep. 29, 2020, 20 pages.
"Final Office Action", U.S. Appl. No. 15/716,348, dated Aug. 7, 2020, 28 pages.
"Final Office Action", U.S. Appl. No. 15/801,173, dated Sep. 16, 2020, 30 pages.
"Notice of Allowance", U.S. Appl. No. 15/801,090, dated Aug. 13, 2020, 15 pages.
"Notice of Allowance", U.S. Appl. No. 16/867,321, dated Oct. 5, 2020, 8 pages.
Frey, Nathan et al., "Automated Advertisement Creation System", IP.com No. IPCOM000251275D, Oct. 29, 2017, 10 pages.
Ohanian, Tom , "How Artificial Intelligence and Machine Learning Will Change Content Creation Methodologies", SMPTE 2017 Annual Technical Conference and Exhibition, Hollywood & Highland, Los Angeles, California, Oct. 23, 2017, 15 pages.
Thai, Jenny , "The GACTS of life: how we mastered the marketing brief", https://wavelength.asana.com/workstyle-gacts-mastered-marketing-brief/#close, Apr. 28, 2016, 11 pages.
Xia, Bohui et al., "Deep Neural Network-Based Click-Through Rate Prediction using Multimodal Features of Online Banners", 2019 IEEE Fifth International Conference on Multimedia Big Data (Big MM), Sep. 11, 2019, 9 pages.
"First Action Interview Office Action", U.S. Appl. No. 15/785,329, dated May 14, 2021, 4 pages.
"Non-Final Office Action", U.S. Appl. No. 16/827,413, dated Mar. 31, 2021, 11 pages.
"Non-Final Office Action", U.S. Appl. No. 15/716,348, dated Mar. 29, 2021, 26 pages.
"Notice of Allowance", U.S. Appl. No. 16/827,413, dated May 13, 2021, 9 pages.
"Corrected Notice of Allowability", U.S. Appl. No. 16/867,321, dated Jan. 6, 2021, 2 pages.
"Corrected Notice of Allowability", U.S. Appl. No. 16/867,321, dated Feb. 12, 2021, 2 pages.
"Corrected Notice of Allowability", U.S. Appl. No. 15/801,173, dated Jan. 28, 2021, 8 pages.
"Notice of Allowability", U.S. Appl. No. 16/867,321, dated Dec. 7, 2020, 2 pages.
"Notice of Allowance", U.S. Appl. No. 15/801,173, dated Jan. 22, 2021, 11 pages.
"Pre-Interview First Office Action", U.S. Appl. No. 15/785,329, dated Jan. 25, 2021, 4 pages.
"Pre-Interview First Office Action", U.S. Appl. No. 16/827,413, dated Nov. 25, 2020, 4 pages.

(56) References Cited

OTHER PUBLICATIONS

Benjamin, Dan, "Random Image Rotation", A List Apart Blog [retrieved Nov. 25, 2020]. Retrieved from the Internet <https://alistapart.com/article/randomizer/>., Oct. 20, 2003, 28 pages.
"Corrected Notice of Allowability", U.S. Appl. No. 16/827,413, dated Sep. 1, 2021, 2 pages.
"Final Office Action", U.S. Appl. No. 15/785,329, dated Aug. 19, 2021, 12 pages.
"Final Office Action", U.S. Appl. No. 15/716,348, dated Jul. 26, 2021, 26 pages.
"First Action Interview Office Action", U.S. Appl. No. 17/007,253, dated Aug. 12, 2021, 3 pages.
"Notice of Allowance", U.S. Appl. No. 17/007,253, dated Sep. 23, 2021, 7 pages.
"Patent Trial and Appeal Board Decision", U.S. Appl. No. 15/783,228, filed Sep. 23, 2021, 20 pages.
"Pre-Interview First Office Action", U.S. Appl. No. 17/007,253, dated Jul. 23, 2021, 3 pages.
"Corrected Notice of Allowability", U.S. Appl. No. 15/726,125, dated Apr. 24, 2020, 2 pages.
"Non-Final Office Action", U.S. Appl. No. 15/783,228, dated Apr. 17, 2020, 30 pages.
"First Action Interview Office Action", U.S. Appl. No. 15/801,090, dated Apr. 14, 2020, 4 pages.
"Notice of Allowance", U.S. Appl. No. 15/785,298, dated Jun. 1, 2020, 7 pages.
"Supplemental Notice of Allowability", U.S. Appl. No. 15/801,090, dated Oct. 23, 2020, 2 pages.
"Corrected Notice of Allowability", U.S. Appl. No. 17/007,253, dated Jan. 5, 2022, 2 pages.
"Corrected Notice of Allowability", U.S. Appl. No. 17/007,253, dated Nov. 5, 2021, 2 pages.
"Examiner's Answer", U.S. Appl. No. 15/716,348, dated Dec. 17, 2021, 16 pages.
"Non-Final Office Action", U.S. Appl. No. 15/785,329, dated Nov. 26, 2021, 7 pages.
U.S. Appl. No. 15/785,329, "Final Office Action", U.S. Appl. No. 15/785,329, dated Jun. 9, 2022, 9 pages.
U.S. Appl. No. 15/785,329, "Notice of Allowance", U.S. Appl. No. 15/785,329, dated Aug. 19, 2022, 5 pages.

\* cited by examiner

DIGITAL MEDIA ENVIRONMENT FOR ANALYSIS OF AUDIENCE SEGMENTS IN A DIGITAL MARKETING CAMPAIGN

BACKGROUND

Analytics systems have been developed to collect and analyze large sets of data to identify trends, patterns, and correlations in the data that are not readily observable by humans due to the amount of data. In one example of analysis performed by an analytics system, a variety of additional insights are gained into operation of a service provider system within a digital medium environment, such as a web service, online provider of goods and services, and so forth. In a digital marketing scenario, for instance, this may be used to identify segments (e.g., subsets) of an audience in order to target digital marketing content to increase a likelihood of conversion. Other examples include insights into computational resource consumption by the service provider system, tracking of expenses and revenue, number of visitors to a web service, page views, and so forth.

Conventional analytics systems support a variety of techniques that support user interaction with the data in order to gain access to this insight provided by the analytics system, such as to evaluate values of different metrics described in the analytics data via a user interface. The user interface of the analytics system, for instance, may be configured to output different combinations of metrics that have been associated by the system, values of those metrics, trends exhibited by the values of those metrics and correlated metrics, and so on. Conventional analytics systems also typically perform audience segmentation for analysis of metrics by dividing the audience (e.g., through non-negative matrix factorization) into homogeneous subgroups based upon defined criterion such as product usage, demographics, psychographics, communication behaviors and media use. Then, conventional analytics systems determine values of the metrics on the audience segments created from these homogeneous subgroups.

However, conventional analytics systems do not account for a number of additional factors when evaluating values of different metrics, including the effects of individual components of an item of digital marketing content on temporal aspects (e.g., when and in what environment digital marketing content was consumed), channels by which the digital marketing content was consumed, and how these factors combine with previous segmentation techniques to result in a particular outcome. Consequently, conventional analytics systems may provide limited insight as to the effects of components of an item of digital marketing content on how, where, what, with whom, and when an audience segment consumed digital marketing content, and resulting outcomes of the item of digital marketing content based on its components in different scenarios.

SUMMARY

Techniques and systems are described to enable users to optimize a digital marketing content system by analyzing individual components of digital marketing content in different environments of consumption and channels of consumption. In this way, these techniques provide advantages over conventional techniques and systems that do not address how individual components affect the outcomes of digital content in different scenarios. For example, a computing device of an analytics system receives user interaction data that describes an effect of user interaction with a plurality of items of digital marketing content on achieving an action for multiple audience segments, e.g., on conversion of a good or service. Each digital marketing content item is made up of a plurality of components that such as text, photographs, vector artwork, digital images, 3-dimensional (3D) objects, haptic outputs, audio, and/or video.

The analytics system identifies which of a plurality of components are included in respective items of digital marketing content, such as by analyzing metadata of the items of digital marketing content, using digital image recognition techniques, sound recognition techniques, and so forth. The analytics system then generates data identifying different aspects that likely had an effect on the achieving an action on the items of digital marketing content. For example, the analytics system generates data for individual components of the items of digital marketing content, and how the individual components affected an outcome of the items of digital marketing content in different environments in which the items of digital marketing content are consumed, different channels in which the digital marketing content items are consumed, or any combination of the above aspects. To do so, the analytics system uses a model trained by machine learning to determine the effects of individual components within an item of digital marketing content on various metrics in different environments and channels of consumption. Additionally, the analytics system can generate data for any of the above aspects for individual segments of the audience. The analytics system outputs a result based on the data in a user interface, and can generate additional items of digital marketing content based on the data in real time. Having access to data and recommendations on which components were effective in different environments and channels of consumption with different audience segments gives marketing teams an opportunity to deliver content more efficiently and cost-effectively than using conventional techniques that only rely upon audience segmentation alone.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
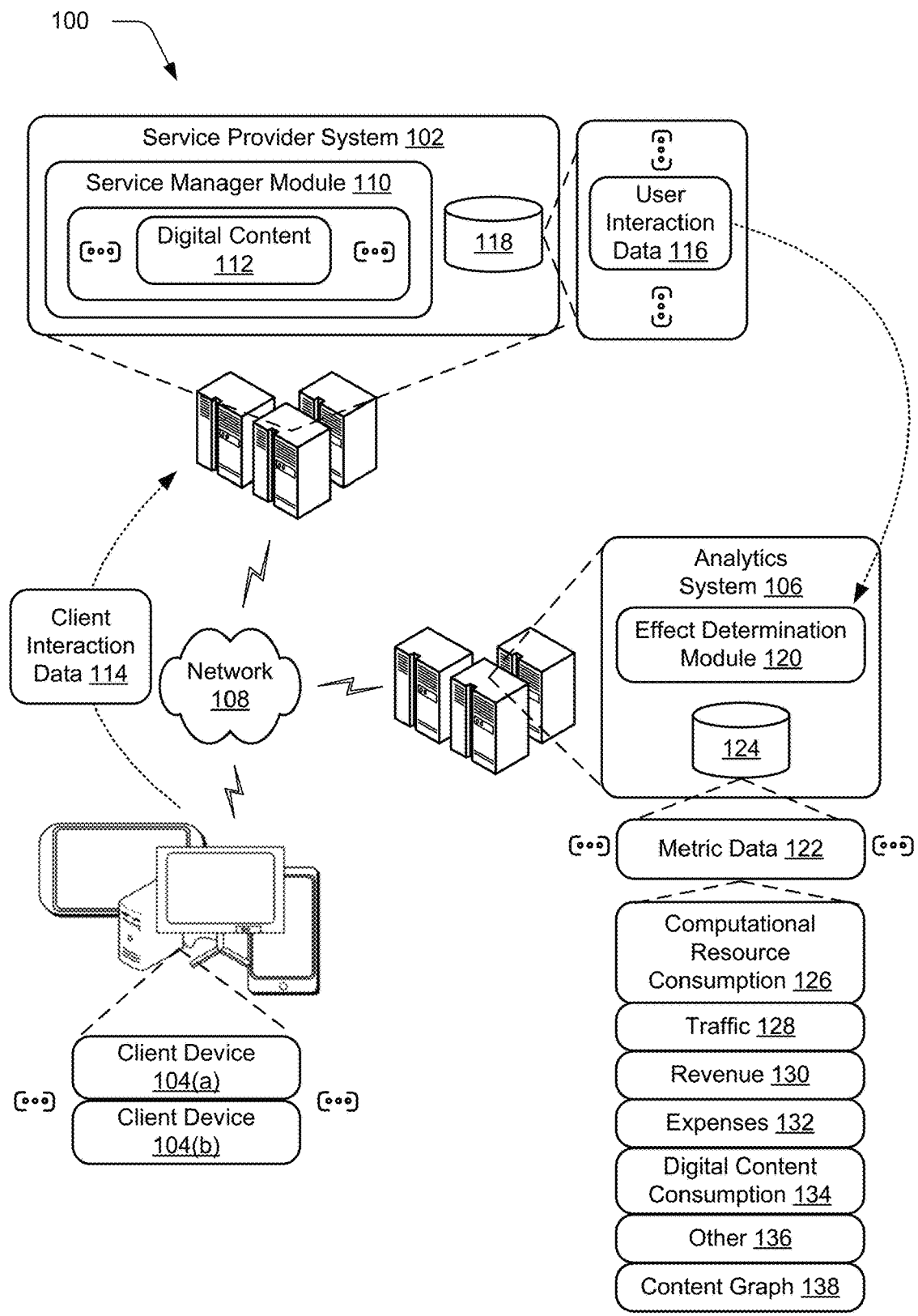
FIG. 1 is an illustration of an environment in an example implementation that is operable to employ techniques for analysis of audience segments of a digital marketing campaign as described herein.

Analytics systems may be used to give a variety of insights into operation of a service provider system based on correlations, trends, and patterns exhibited by data collected from the service provider system. Conventional analytics systems, however, typically limit the scope of metrics used to analyze data to static labels applied to different audience segments and digital marketing content items as a whole. When determining success of a digital marketing content item in a digital marketing campaign, for instance, conventional analytics systems may rely upon established demographic metrics, such as metrics that describe metrics of a user, geographic location, and so on. Once the audience segments are established, the analytics system measures success of a digital marketing content item as a whole within the constraints imposed by the audience segments, e.g., on conversion.

Conventional analytics systems, using the above-described techniques, therefore provide a limited amount of relevant information in the analysis of user interaction with a digital marketing content item. For example, conventional analytics systems do not provide information as to how different components of a digital marketing content item affect different audience segments. Components refer to individual pieces that make up an item of digital marketing content, which may include text, photographs, vector artwork, digital images, 3D objects, haptic outputs, audio, and/or video, and these in turn may include attributes such as color, size, location within an item of content, duration of display, content creator, actions, activities, and so forth.

Conventional analytics systems also do not provide information on how different components of a digital marketing content item affect an outcome in an environment in which the digital marketing content item is consumed. An environment refers to a place, time, with whom, and possibly why a user consumes an item of digital marketing content. Additionally, conventional analytics systems do not provide information on how different components of a digital marketing content item affect an outcome in different channels of consumption. Channels are the means by which an item of digital marketing content is consumed, such as television, radio, print media, email, online advertisement, and so forth.

In particular, environments and channels may change after an item of digital marketing content is delivered to an audience. Because conventional analytics systems fail to provide metric analysis of components of the item of digital marketing content with audience segments, environments, and channels individually, these systems cannot provide combinations of these metrics for analysis, leaving a vast amount of information unavailable.

Accordingly, techniques and systems for analyzing audience segments by a service provider system in consideration of effects of components with audience segments, environments, and channels of consumption of items of digital marketing content in a digital media environment are described. The service provider system, for instance, may be configured to provide digital content as an online application (e.g., for subscription based access), provide opportunities to purchase a good or service, online storage, or other web service that is accessible via a network.

Operation of the service provider system in providing this access to the digital content may be described in usage data using a variety of metrics and values of those metrics. Metrics include any measurable characteristic that may be described in the operation of the service provider system to provide the digital content for access via the network. Examples of metrics include computational resource consumption (e.g., storage, network, or processing), traffic (e.g., a number of visitors, page views), revenue, expenses, conversion rate, and so forth.

To begin, a computing device of an analytics system receives user interaction data for multiple audience segments describing an effect of user interaction with a plurality of items of digital marketing content on achieving an action, e.g., conversion of a good or service. Audience segments are subsets of an audience having homogeneous characteristics. The characteristics used to indicate the segments may include defined criterion in categories such as product usage, demographics, psychographics, communication behaviors and media use, to name a few examples.

The digital marketing content may take any form of digital content used in a digital marketing campaign, such as commercials during a television or radio program; printed advertisements appearing in newspapers or magazines; support media delivered through billboards, transits, bus benches, directories, and so forth; direct marketing through mail, telemarketing, and email; product placement in a television show, movie, or theme park; or internet promotion via banner advertisements, pop-up advertisements, text advertisements, virtual reality advertisements, and paid search placements. Interaction with the digital marketing content items can also take a variety of forms, such as converting a good or service as a result of consuming a digital marketing content item, clicking on a banner advertisement or email link to the seller's website, calling a phone number listed on a television or radio advertisement for additional information about the good or service, and so on. The user interaction data indicates outcomes of an item of digital marketing content, such as whether the item of digital marketing content was successful, unsuccessful, or had no effect on achieving the action as part of the digital marketing campaign. Different metrics may be used in the interaction data to indicate an outcome of the item of digital marketing content, such as number of page views, page viewing time, bounce rate, emails opened or deleted, and so forth.

The analytics system then identifies which of a plurality of components are included in respective ones of the plurality of items of digital marketing content. Each of the items of digital marketing content is made up of a plurality of components that may include text, photographs, vector artwork, digital images, 3D objects, haptic outputs, audio, and/or video, which in turn may include attributes such as color, size, location in the content item, duration of display, content creator, actions, activities, and so forth. Identifying components, and attributes of components, can include analyzing metadata or HTML associated with a particular digital marketing content item, object recognition within the digital marketing content item, sound recognition for the digital marketing content item, and so forth.

From this, the analytics system generates data identifying different aspects that likely had an effect on the achieving an action on the items of digital marketing content. The analytics system can generate data for individual components of the items of digital marketing content relating to audience segments that consumed the items of digital marketing content, environments in which the items of digital marketing content are consumed, channels in which the digital marketing content items are consumed, or any combination of the above aspects.

For example, the analytics system generates outcome data for the individual members of the audience describing whether the effect likely resulted from the multiple segments indicated in the segment data or from one or more of the components included in the respective items of digital marketing content. The analytics system, for instance, compares the user interaction data for a component shared between two items of digital marketing content that have been presented to two different audience segments. If one audience segment was more successful at achieving a particular outcome in response to the item of digital marketing content, then the analytics system determines that the component had a corresponding effect on that audience segment.

In one example, the analytics system can determine that a particular audience segment, such as age, was the most determinative factor in determining an outcome of the digital marketing content, and that none of the plurality of components affected the outcome of the digital marketing content. Alternatively, the analytics system may determine that a particular one of the plurality of components was a most determinative factor in determining the outcome of the digital marketing content, and the audience segments did not play a role in determining the outcome of the digital marketing content. Additionally, the analytics system can determine that a particular combination of the plurality of components and audience segments were most determinative of an outcome of the digital marketing content, while other combinations did not affect the outcome.

Alternatively or additionally, the analytics system generates consumption data for the digital marketing content items indicating an environment of consumption of the digital marketing content by the individual members of the audience. As discussed above, the environment refers to a place, time, with whom, and possibly why a user consumes the digital marketing content. For example, an individual member of the audience may consume a banner advertisement as digital marketing content at work in a cubicle surrounded by coworkers while doing work-related internet research. The same individual member of the audience may consume the banner advertisement at home while playing a computer game with a child. The banner advertisement, for instance, includes an animation component that goes unnoticed by the individual member of the audience while at work, but results in a click on the banner advertisement at home when viewed in the company of a child. These environments may thus result in entirely different outcomes of the banner advertisement, and thus are usable to gain insight into analyzing the success of digital marketing content that is not possible using conventional techniques.

Alternatively or additionally, the analytics system generates consumption data for the digital marketing content items indicating a channel of consumption of the digital marketing content by the individual members of the audience. As discussed above, the channel refers to a technique by which a user consumes digital marketing content, such as television, radio, print media, email, online advertisement, and so forth. For example, an individual member of the audience may convert on purchasing a good or service that is seen advertised during a favorite television program having a component that relates to the favorite television program, and may not convert on purchasing the good or service when the same advertisement is displayed before watching a video on a mobile phone, where the video on the mobile phone does not include the component that relates to the favorite television program.

Using the consumption data for the environment and/or the channel of consumption, the analytics system then generates outcome data for the audience describing whether the effect likely resulted from the identified components, or from the multiple segments indicated in the segment data, the environment of consumption, or the channel of consumption. For example, the analytics system leverages machine learning to determine whether the effect likely resulted from the components or from the audience segments, environment of consumption, or channel of consumption. The analytics system, for instance, collects training data that describes user interaction with respective items of digital marketing content that are output as part of a digital marketing campaign. The training data may include data on a variety of components in items of digital marketing content that are presented to different audience segments, in different environments, and/or via different channels. From this, the analytics system trains a model using machine learning to generate recommendations that are usable to predict which items of digital marketing content, and/or components within items of digital marketing content, are likely to be successful in causing performance of a desired action, e.g., conversion of a good or service. Additionally, the analytics system trains the model using machine learning to generate recommendations which may be used to deliver automatically generated items of digital marketing content containing determined effective components, to a particular audience segment, in a determined environment, and though a particular channel at a time that is most likely to result in a desired action.

The analytics system can therefore determine the likely effect of different components of the digital marketing content from between variations including the audience segments, a channel by which the digital marketing content is delivered and presented, and/or an environment in which the digital marketing content item was consumed. Having access to this information gives marketing teams an opportunity to deliver the right content having the right components to the right audience, at the right time, and through the right channels. In this way, resources are allocated with increased efficiency during a marketing campaign, as digital marketing content can be targeted towards a specific audience based on additional data including what, where, when, and why to deliver to an audience segment, rather than guessing how that audience segment might respond or what component of the digital marketing content item likely caused this response.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital marketing content component analysis techniques described herein. The illustrated environment 100 includes a service provider system 102, client devices 104(a) and 104(b), and an analytics system 106 that are communicatively coupled, one to another, via a network 108. Computing devices that implement the service provider system 102, the client devices 104(a) and 104(b), and the analytics system 106 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider and analytics systems 102, 106 and as further described in FIG. 11.

The service provider system 102 is illustrated as including a service manager module 110 that is implemented at least partially in hardware of a computing device. The service manager module 110 is configured to manage online interaction of the client devices 104(a) and 104(b) with digital content 112 of the service provider system 102 via the network 108. As previously described, the digital content 112 may take a variety of forms, such as an online application, online storage, web service, digital images, digital audio, multimedia, and so forth. Thus, client interaction data 114 communicated via the network 108 involving interaction with the digital content 112 by the client devices 104(a) and 104(b) via the network 108 may also take a variety of forms, such as selection of a menu item, voice command, gesture, selection of a hyperlink, and so forth.

A user of client device 104(a), for instance, may create the digital content 112 by accessing the service manager module 110 via the network 108, such as to create an illustration, movie, audio data, and so forth. This may include execution of applications locally by the client device 104(a) and remotely by the service provider system 102 that both involve actions taken with respect to the digital content 112. As part of this, a user of the client device 104(a) may initiate operations involving interaction with the digital content 112, such as to draw a line, color a shape, enter text, and so forth. Thus, initiation of these operations is considered performance of an action involving interaction with the digital content 112. Other examples are also contemplated in which the digital content 112 is an application, web service, and so forth and thus different interactions with the digital content 112 (e.g., a user interface of the digital content 112) also correspond to different actions, e.g., selection of a link, an item in a user interface, and so forth.

The service manager module 110 is configured to generate user interaction data 116, illustrated as stored in storage 118, that describes provision of the digital content 112 that supports this interaction. The user interaction data 116, for instance, may describe interactions of the client device 104(b) with the digital content 112. This may be reflected as a number of visitors, page views, conversions, and so forth. The user interaction data 116 may also describe operation of the service provider system 102 performed in the provision of the digital content 112, such as hardware resources (e.g., processing system, computer-readable storage media, network), software resources, revenue collected, expenses occurred, and so forth.

The user interaction data 116 is this example is then collected by the analytics system 106 via the network 108. The analytics system 106 includes an effect determination module 120 that is implemented at least partially in hardware of a computing device (e.g., a processing system and computer readable storage medium) to generate metric data 122 from the user interaction data 116, which is illustrated as stored in storage 124. The metric data 122 is configured to analyze individual components of digital marketing content items for metrics involving provision of the digital content 112 by the service provider system 102.

The metric data 122, for instance, may be configured to analyze components of a digital marketing content item using values of computational resource consumption 126 by the service provider system 102. Computational resource consumption 126 may include an amount of processing (e.g., servers, cores, CPUs), memory (e.g., RAM, persistent storage), network (e.g., bandwidth, spikes) resources used by the service provider system 102. In another example, the metric data 122 includes traffic 128 to the service provider system 102, such as number of visitors, page views, and so on. The metric data 122 may also take into account financial considerations of the service provider system 102 in providing the digital content 112, such as revenue 130 and expenses 132. In another example, the metric data 122 includes digital content consumption 134, such as number of downloads, interactions, which items of digital content 112 are viewed (e.g., videos, web pages), how this interaction occurs (e.g., stream, download, browser, mobile application), and so forth.

Other 136 examples of metrics that may be analyzed for components of digital marketing content items by the effect determination module 120 involving provision of the digital content 112 by the service provider system 102 are also contemplated, including metrics describing users and user devices that interact with the digital content 112, such as demographics, product descriptions, and so forth. In implementations, the metric data 122 can also include a content graph 138, including information on various aspects related to a digital marketing campaign. The content graph 138 may include information specific to an item of digital content 112, including both intrinsic attributes of components of the item of digital content (e.g., size, color, objects, digital images, video, 3D objects, etc.) and attached attributes of components of the item of digital content (e.g., author, producer, sound editor, audience members who performed an action on the item of digital content, etc.). The effect determination module 120 may generate and utilize this metric data 122 in a variety of ways, an example of which is described in greater detail in the following discussion and is shown in a corresponding figure.

Figure 2:
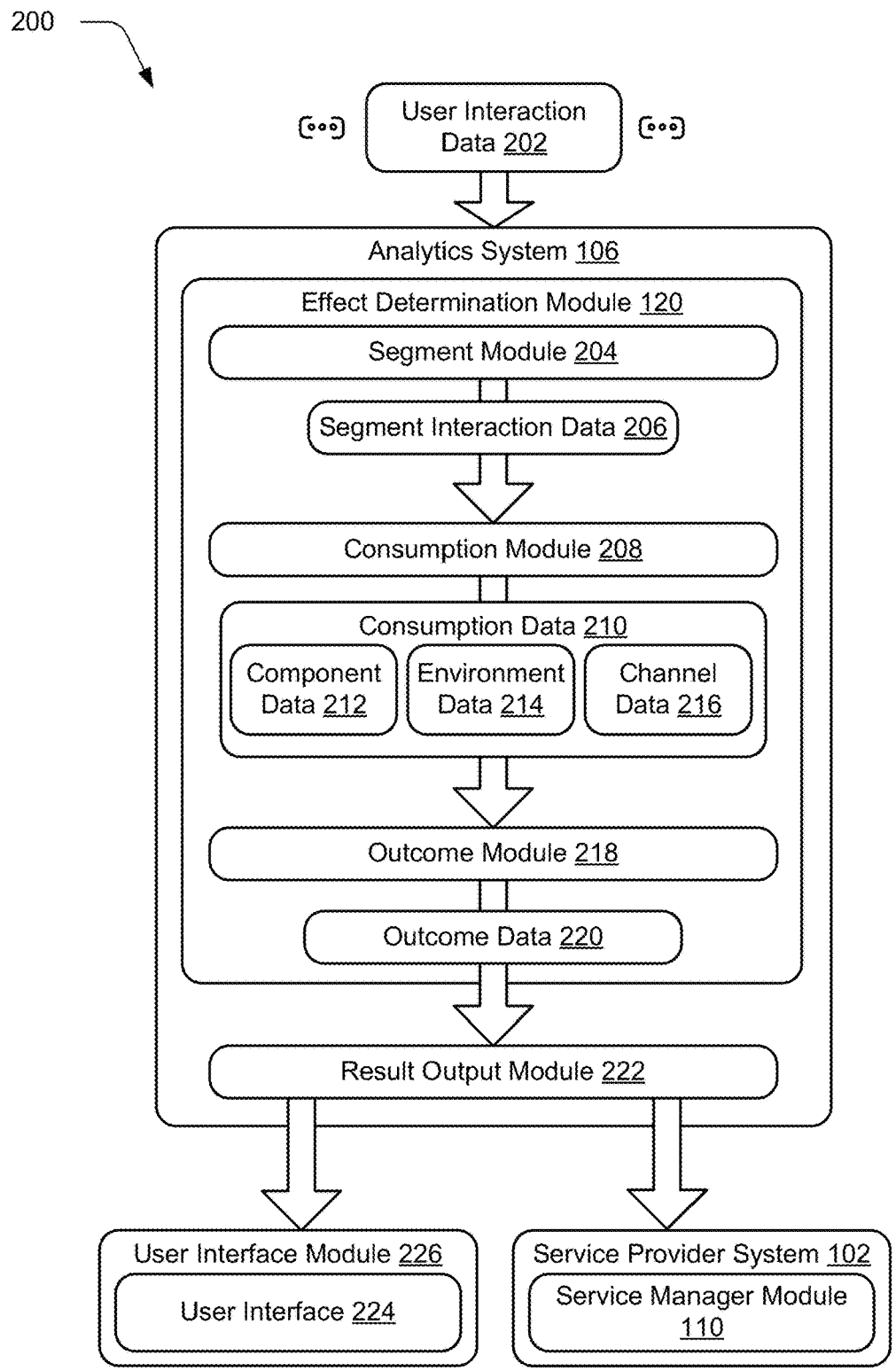
FIG. 2 depicts a system in an example implementation showing operation of an effect determination module of FIG. 1 in greater detail.

FIG. 2 depicts a system 200 in an example implementation showing operation of the effect determination module 120 of FIG. 1 in greater detail. To begin in this example, user interaction data 202 for segments of an audience is received by a segment module 204 of the effect determination module 120. The user interaction data 202 describes an effect of user interaction with a plurality of items of digital marketing content of the digital content 112 on achieving an action. The user interaction is generally dependent on the type of digital marketing content item, and describes how users responded to presentation of the digital marketing content item such as by clicking on the digital marketing content item, following a link, navigating to different pages of a website, and so forth. The user interaction with the digital marketing content items consequently affects whether an action, such as conversion (e.g., purchasing, viewing, downloading, etc.) of a good or service is achieved. For example, a user may navigate through several pages of a web site (e.g., user interaction) before purchasing a product sold on the web site (e.g., achieving an action). In this example, the number of pages navigated on the website can be indicative of the effect on achieving the final action of purchasing the product from the web site.

The user interaction data 202 includes data for at least one audience segment. As discussed above, audience segments are subsets of an audience having homogeneous characteristics. The characteristics used to indicate the segments may include defined criterion in categories such as product usage, demographics, psychographics, communication behaviors and media use, to name a few examples. The characteristics used to indicate the segments may be assumed to have similar interests, needs, and behavioral patterns. Audience segments may be formed in a variety of ways, such as manually specified through user interaction with a user interface or automatically and without user interaction, e.g., through non-negative matrix factorization.

Digital content can be tailored to the segments based on segments' susceptibility and receptivity to the digital content. The segment module 204 generates segment interaction data 206 which identifies how different segments of the audience interacted with the items of digital marketing content of the digital content 112. The segment interaction data 206 also identifies whether individuals in different segments of the audience achieved the action, and how many individuals in a particular segment achieved the action.

A user of the analytics system 106, for instance, may interact with a user interface of the analytics system 106 as part of the receipt of the user interaction data 202. The user interface is configured to support a flexible reporting and analytics work space in which a user may interact with usage data 116 that describes values of metrics involving provision of the digital content 112 by the service provider system 102. The user interface, for instance, may be configured to output correlations, trends, and patterns exhibited by values of metrics of the usage data 116, which may be learned automatically and without user intervention by the analytics system 106 or based on manual inputs from a user, at least in part. A user of the analytics system 106 may interact with the user interface to request display of an output of the segment interaction data 206 and/or additional data as generated by the effect determination module 120 as described in more detail below.

A consumption module 208 receives the segment interaction data 206, and generates consumption data 210 that identifies different aspects that likely had an effect on achieving the action on the items of digital marketing content. The consumption module 208 generates data for components of the items of digital marketing content, along with environments in which the items of digital marketing content are consumed, channels in which the digital marketing content items are consumed, or any combination of the above aspects. Additionally, the consumption module 208 can generate data for any of the above aspects for individual segments of the audience.

The consumption data 210, for instance, can include component data 212 that identifies which of a plurality of components are included in respective ones of the plurality of items of digital marketing content. The items of digital marketing content may be any form of digital content used in a digital marketing campaign, such as commercials during a television or radio program; printed advertisements appearing in newspapers or magazines; support media delivered through billboards, transits, bus benches, directories, and so forth; direct marketing through mail, telemarketing, and email; product placement in a television show, movie, or theme park; or internet promotion via banner advertisements, pop-up advertisements, text advertisements, virtual reality advertisements, and paid search placements. Each of the items of digital marketing content are made up of a plurality of components that may include text, photographs, vector artwork, digital images, audio, 3D objects, haptic outputs, and/or video, which in turn may include attributes such as color, size, location in the content item, duration of display, content creator, actions, activities, and so forth.

The consumption module 208 can identify the plurality of components, and attributes of the components, using a variety of techniques. For instance, the consumption module 208 can access metadata, HTML, or other information associated with a digital marketing content item for information on components or attributes of components. If a particular digital marketing content item is a digital image, vector artwork, or a video, the consumption module 208 may use object recognition techniques to identify the plurality of components, such as CAD-like object models; appearance-based methods such as edge matching, divide-and-conquer search, and gradient or grayscale matching; feature-based methods such as interpretation trees, hypothesize-and-test techniques, pose consistency, pose clustering, or geometric hashing; genetic algorithms, and so forth.

Figure 8:
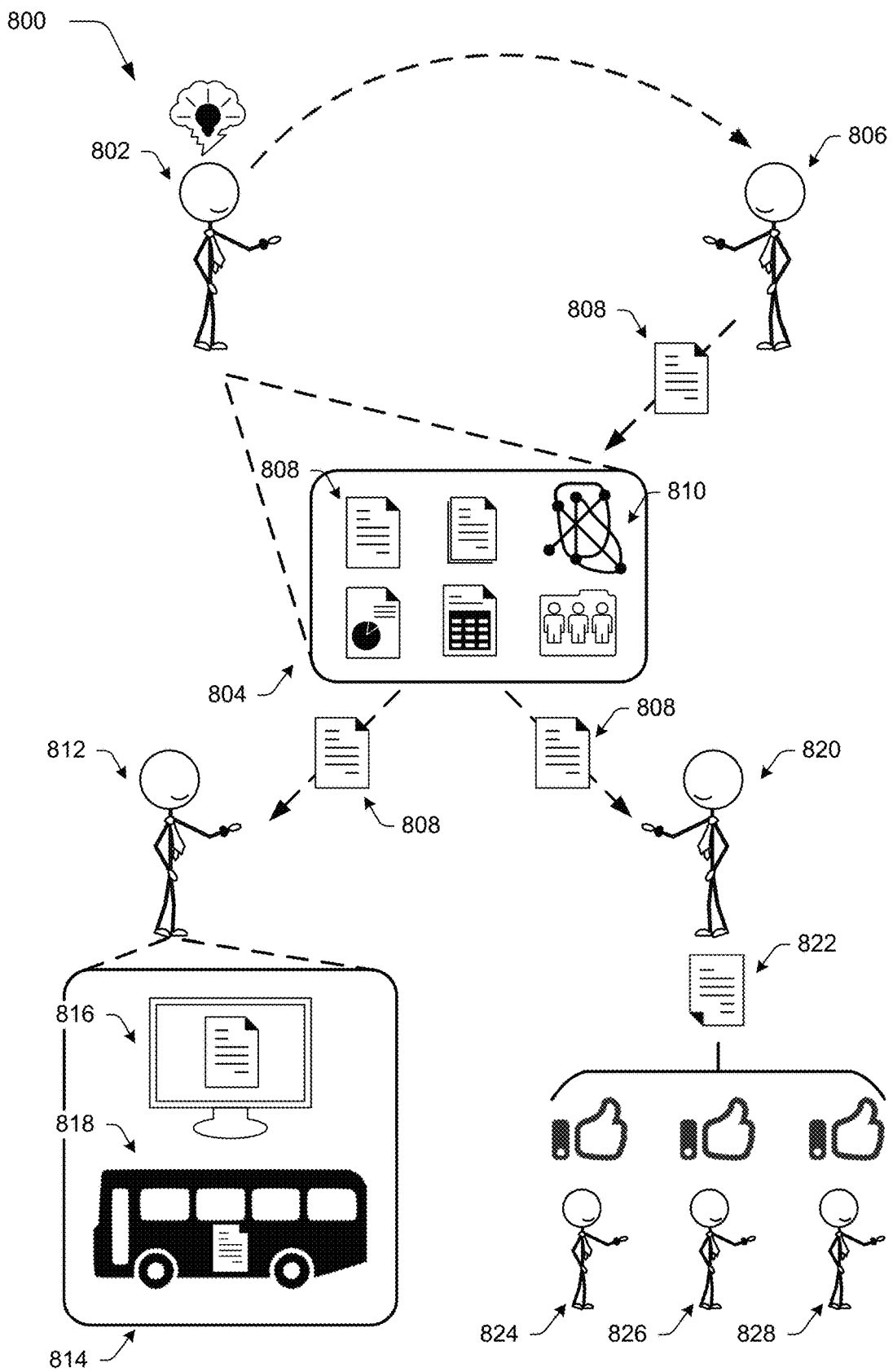
FIG. 8 depicts an environment including operation of an analytics system configured to generate a content graph connecting users, content, and attributes for an item of digital marketing content.

If the digital marketing content item contains audio content, the consumption module 208 may use speech or music recognition to identify the plurality of components. The consumption module 208 may use both object recognition techniques and sound recognition techniques for a single digital marketing content item to identify both visual components and auditory components of the digital marketing content item. The consumption module 208 may also identify components or attributes of the digital marketing content item from a content graph associated with the digital marketing content item, which is discussed in detail with regards to FIG. 8.

The component data 212 also includes attributes of the plurality of identified components of the items of digital marketing content, such as content type, size, location in a digital marketing content item, location in relationship to other components, duration, color, and so forth. The attributes included in the component data 212 describe features or properties of the digital marketing content items. For example, a digital marketing content item such as a banner advertisement may include a digital image of a shoe, which is identified as a component of the banner advertisement. The shoe, then, may have attributes such as color, size, an effect applied to the digital image of the shoe, and so on. The component data 212 may be incorporated into a content graph that connects users, including segments included in the segment interaction data 206, with content and attributes, as discussed in more detail in relation to FIG. 8.

Figure 3:
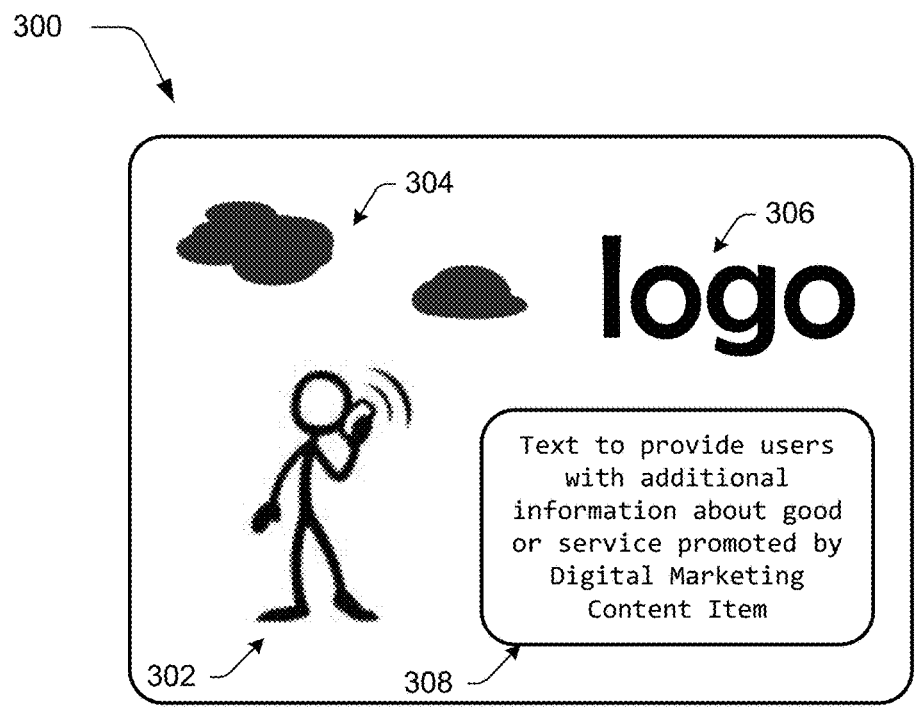
FIG. 3 depicts an example implementation showing a digital marketing content item having a plurality of components which may be analyzed using the techniques and systems described herein.
Figure 3:
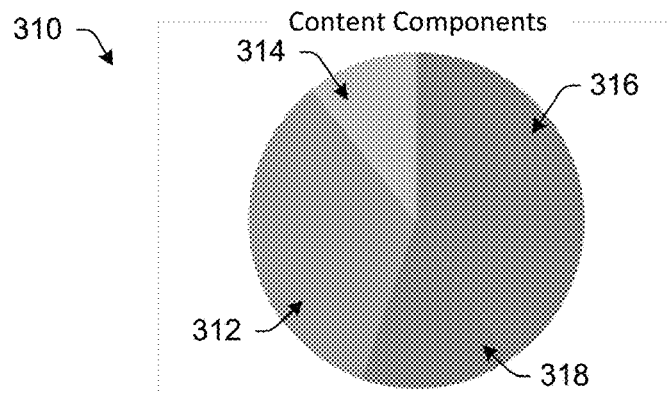
Figure 3:
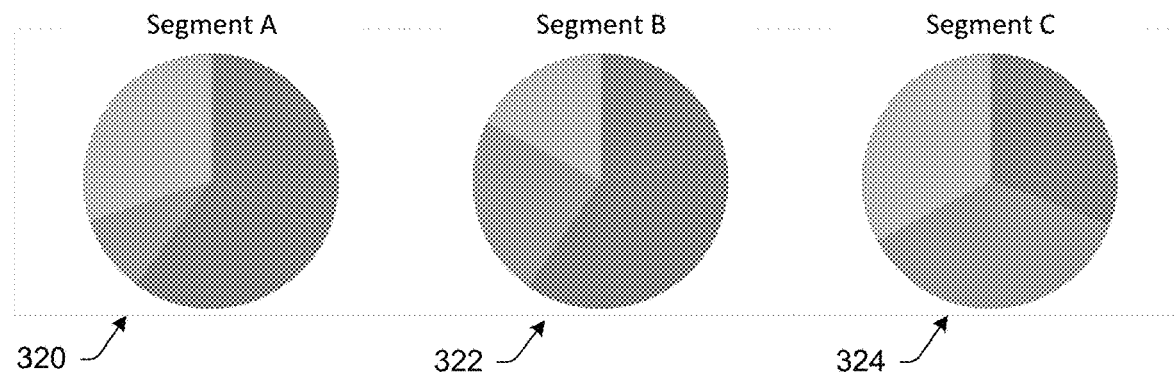

For example, consider FIG. 3, which depicts an example implementation showing a digital marketing content item 300 having a plurality of components. The components include a first digital image 302 of a user, a second digital image 304 of weather, a vector artwork 306 of a logo, and a text box 308. Each of these components of the digital marketing content item 300 may have their own respective attributes. For instance, the components 302, 304, 306, and 308 in the digital marketing content item 300 each have intrinsic attributes such as size, color, and location within the digital marketing content item. Additionally, the components 302, 304, 306, and 308 in the digital marketing content item 300 may have attached attributes that associate a user or application to a digital marketing content item or component in the digital marketing content item, such as author, producer, sound editor, audience members who performed an action on the item of digital content, and so forth.

Different components of the same digital marketing content item may have different effects on the success of the digital marketing content item in achieving an action, and on different metrics associated with the outcome of the digital marketing content item. Also, both intrinsic and attached attributes of individual components may have an effect on achieving an action. The consumption module 208 determines effects of both individual components, and individual attributes of components, on the likely effect of the components and/or attributes on achieving the action, and includes this information in the component data 212. The effect in this example is clicks by users on the digital marketing content item 300, although any likely effect of user interaction may be determined by the outcome module 210, such as conversion, page views, time viewed, "likes" in a social networking application, bounce rate, and so forth.

A first chart 310 is shown with the effects of the different components 302, 304, 306, and 308 on achieving the action by the digital marketing content item 300. A first portion 312 of the chart 310 corresponds to the effect of the digital image component 302; a second portion 314 of the chart corresponds to the effect of the digital image component 304; a third portion 316 of the chart corresponds to the effect of the vector graphic component 306; and a fourth portion 318 of the chart corresponds to the effect of the text box component 308. As shown in the first chart 310 of this example, clicks by users were most affected by the vector graphic component 304 represented by the third portion 316 and largest portion in the first chart. While the first chart shows the effect of the components 302, 304, 306, and 308 on achieving the action, attributes of the components may also be analyzed to determine the effect that different component attributes have on achieving the action as well.

Three additional charts 320, 322, and 324 are also shown, representing the effects of the components 302, 304, 306, and 308 on achieving the action by three different segments of the audience. The additional charts 320, 322, and 324 show that the different components had varying effects on the different segments at achieving the action. Consequently, the effects included in the component data 212 provide insight as to which individual components and attributes are most effective in particular audience segments. This provides advantages over conventional systems, which are not able to address "what" component is included in the digital marketing content but rather merely rely on identification of the digital marketing content as a whole. As a result, conventional analytics systems are limited to identification of a particular item of digital marketing content (e.g., a banner advertisement) presented across audience segments, and not able to address how individual components of the digital marketing content, such as a color scheme used in the banner advertisement, size or location of objects in the banner advertisement, and so forth affect different audience segments.

The effects of the different components 302, 304, 306, and 308 represented in the charts 310, 320, 322, and 324 can be measured in a variety of ways. In one example, the consumption module 208 compares the user interaction data 202 for one of the components to user interaction data for a component in a different digital marketing content item that has the same or similar characteristics. If both components that have the same or similar characteristics appearing in two different digital marketing content items had similar outcomes (e.g., both were successful or unsuccessful at achieving an action), then the consumption module 208 can determine that the component had a corresponding effect on the outcome of both digital marketing content items. Additional examples include surveying an audience, assessing which of the components 302, 304, 306, and 308 was clicked on, comments made on different components of the digital marketing content item 300 on social media, keywords used to search for the product or service promoted by the digital marketing content item that relate to the individual components, and so forth.

Returning to a discussion of FIG. 2, the consumption module 208 generates environment data 214 for the digital marketing content items indicating an environment of consumption of the digital marketing content by the individual members of the audience. As discussed above, the environment refers to a place, time, with whom, and possibly why a user consumes the digital marketing content. Different environments may result in entirely different outcomes of digital marketing content, and thus are important metrics to include when analyzing the success of the digital marketing content and individual components of items of digital marketing content.

Figure 4:
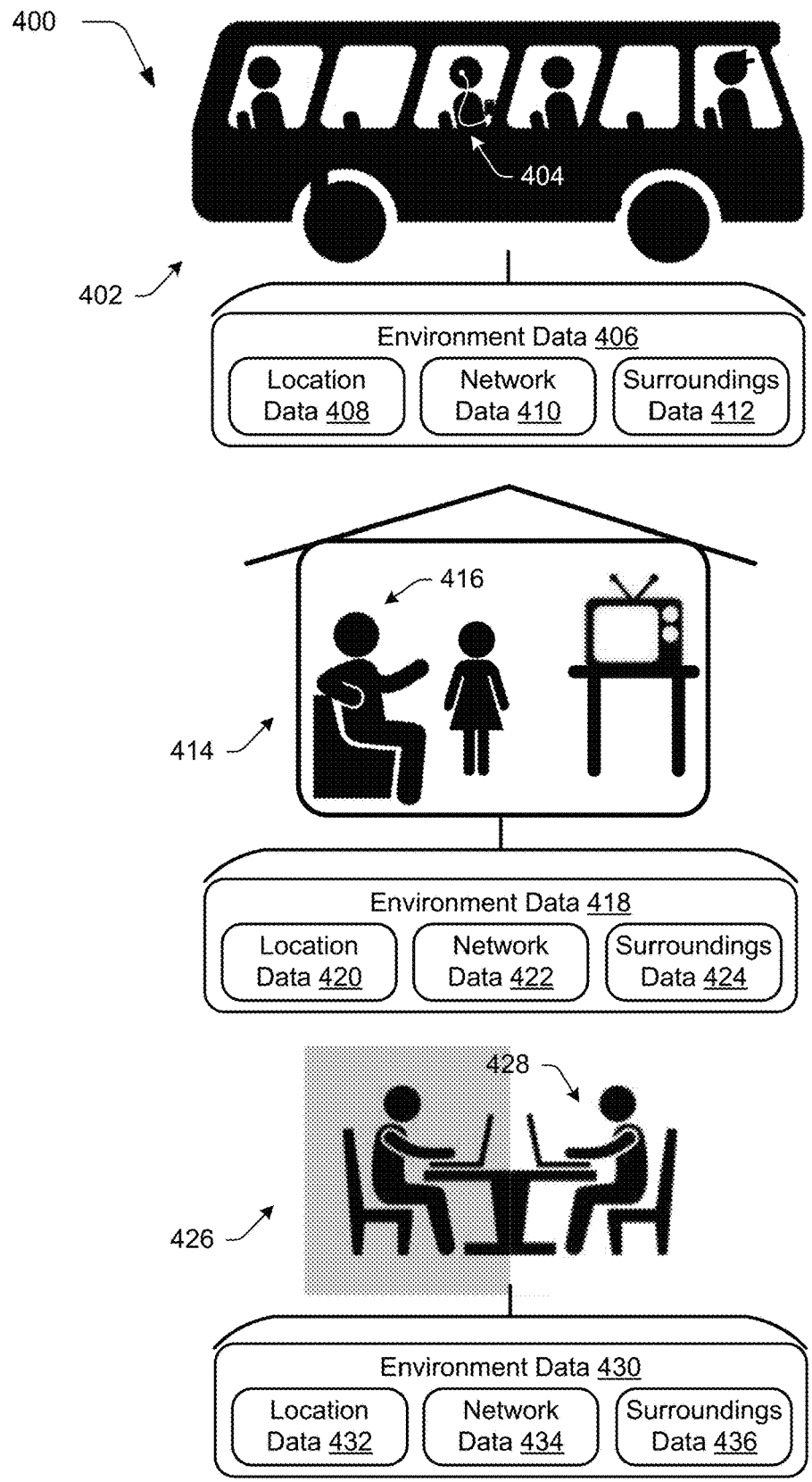
FIG. 4 depicts an example implementation showing different environments in which items of digital marketing content may be consumed by members of an audience.

For example, consider FIG. 4, which depicts an example implementation 400 showing different environments in which items of digital marketing content may be consumed by members of an audience. A first environment 402 is shown, in which a user 404 is riding a bus while consuming content via a mobile device, at least partially through headphones. The mobile device of the user 404 gathers environment data 406 regarding the first environment 402 in which the content is being consumed. In this example, the mobile device of the user 404 generates location data 408 to include in the environment data 406. The location data 408 indicates a location of the user 404 by way of the mobile device that the user is interacting with. In this scenario, the location data 408 is based on GPS information generated by the mobile device. The location data 408 indicates that the user 404 is traveling at a particular rate of speed, suggesting that the user is a passenger in a motor vehicle.

The mobile device of the user 404 also generates network data 410 to include in the environment data 406. The network data 410 indicates a network that the user 404 is using to send and receive information, such as a Wi-Fi network, cellular network, and so forth. In the first environment 402, the network data 410 is based on a public Wi-Fi network that the user 404 is using provided by the bus on which the user is riding. The network data 410 indicates that at least some aspects of the information that the user 404 is sending and/or receiving may be visible by the Wi-Fi network provided on the bus, because the bus's Wi-Fi network is a public network.

Additionally, the mobile device of the user 404 generates surroundings data 412 to include in the environment data 406. The surroundings data 412 indicates persons, places, or things in the proximity of the user 404 that may be relevant to content displayed by the user's mobile device. The surroundings data 412 also indicates a time of consumption of the content by the user 404.

In the first environment 402, the surroundings data 412 includes information generated by a camera of the user 404's mobile device, social networking applications on the user's mobile device, a microphone of the user's mobile device, and so forth. For example, the user 404 takes a selfie while on the bus in the environment 402 that includes a number of people in the background and posts the photo to the user's social network account. The surroundings data 412 may include information based on the photo, such as the user 404 being surrounded by strangers in a public place. In this example, the surroundings data 412 also includes information specifying that the user 404 is wearing headphones, which may indicate that other persons are nearby and the user wants to keep noises from the mobile device private. The surroundings data 412 further includes data on the time of consumption, in this case that the user 404 is consuming the content during the morning rush hour.

Based on the location data 408, network data 410, and surroundings data 412, the consumption module 208 concludes that the user 404 is in transit on a public network and surrounded by strangers. The consumption module 208 can provide this information to the analytics system 106 to either select items of digital marketing content that have particular components, or generate items of digital marketing content to include particular components, which are appropriate for the environment 402. For example, the analytics system 106 can generate an item of digital marketing content on-the-fly that includes components that the user 404 would not be hesitant to view in a public setting on a public network, that includes an audio component that the user can listen to with the user's headphones, and components that are easy to view while moving on the bus. The analytics system 106 can then deliver the item of digital marketing content having these components to the user 404 for consumption in real time.

In the example implementation 400, a second environment 414 is shown in which a user 416 is at home while consuming content on a smart television. The smart television of the user 416 gathers environment data 418 regarding the second environment 414 in which the content is being consumed. In this example, the smart television of the user 416 generates location data 420 to include in the environment data 418. The location data 420 in this example is based on an IP address that the smart television is associated with. The location data 420 indicates that the user 416 is in their own home, which is typically a private environment.

The smart television of the user 416 also generates network data 422 to include in the environment data 406. In the second environment 414, the network data 410 is based on a private internet connection, such as through the user 416's cable provider. The network data 410 indicates that most of the information that the user 416 is sending and/or receiving is not shared with a third party, as was the case with the public Wi-Fi network included in the network data 410 of the user 404 on the bus.

Additionally, the smart television of the user 416 generates surroundings data 424 to include in the environment data 418. In the second environment 414, the surroundings data 424 includes information generated by a motion sensor of the smart television, e.g., that receives gestures to control the smart television. The surroundings data 424 also includes information on a particular application, channel, and/or program that is being used to display content on the smart television, which may provide an indication of who is watching the smart television in the user 416's home. Further, the surroundings data 424 in this example includes settings that are currently implemented on the smart television, such as a "child-safe" mode when the user 404 is watching the smart television with children. The surroundings data 424 may also include data on the time of consumption, in this case that the user 416 is consuming the content on a weekend morning.

Based on the location data 420, network data 422, and surroundings data 424, the consumption module 208 concludes that the user 416 is watching a television program with the user's child at home. The consumption module 208 can provide this information to the analytics system 106 to either select items of digital marketing content that have particular components, or generate items of digital marketing content to include particular components, which are appropriate for the environment 414. For example, the analytics system 106 can select an item of digital marketing content on-the-fly that include components that the user 416 is comfortable viewing with a child, but may also include components that are personal to the user and that the user would not want strangers to have access to. The analytics system 106 can then deliver the item of digital marketing content having these components to the user 416 for consumption in real time.

Further in the example implementation 400, a third environment 426 is shown in which a user 428 is at work while consuming content on a laptop computer. The laptop computer of the user 428 gathers environment data 430 regarding the third environment 426 in which the content is being consumed. In this example, the laptop computer of the user 428 generates location data 432 to include in the environment data 430. The location data 432 in this example can be based on an IP address associated with the laptop computer, or may be based on GPS information generated by the laptop computer. The location data 432 indicates that the user is in a public environment of the user 428's work.

The laptop computer of the user 428 also generates network data 434 to include in the environment data 430. In the third environment 426, the network data 434 is based on a Wi-Fi connection. However, unlike the public Wi-Fi connection included in the network data 410, the Wi-Fi connection of the third environment 426 is to a private network of the user 428's workplace. Therefore, the network data 434 indicates that the information that the user 428 is sending and/or receiving is shared with a third party, the user's employer.

The laptop computer of the user 428 additionally generates surroundings data 436 to include in the environment data 430. In the third environment 426, the surroundings data 436 includes information generated by a camera of the user 428's laptop computer, applications on the user's laptop computer, a microphone of the user's laptop computer, and so forth. For example, the user 428 may be generating a purchase order for supplies for the user's workplace using an inventory management system. The inventory management system may manage the exchange of information between the laptop computer of the user 428 and any number of remote, mobile devices used to track inventory. The exchange of information as part of the inventory management system is included in the surroundings data 436 indicating where and from who the purchase order is originating. The surroundings data 436 may also include data on the time of consumption, in this case that the user 428 is consuming the content on a weekday afternoon.

Based on the location data 432, network data 434, and surroundings data 436, the consumption module 208 concludes that the user 428 purchasing supplies for the user's workplace while at work. The consumption module 208 can provide this information to the analytics system 106 to either select items of digital marketing content that have particular components, or generate items of digital marketing content to include particular components, which are appropriate for the environment 426. For example, the analytics system 106 can select an item of digital marketing content on-the-fly having components that the user 428 may find useful in completing the purchase order, while avoiding components having information on past personal retail purchases that the user has made and would not want an employer to see. The analytics system 106 can then deliver the item of digital marketing content having these components to the user 428 for consumption in real time.

Returning to a discussion of FIG. 2, the consumption module 208 generates channel data 216 for the digital marketing content items indicating a channel of consumption of the plurality of items of digital marketing content by the individual members of the audience. As discussed above, the channel refers to a technique by which a user consumes digital marketing content, such as television, radio, print media, email, online advertisement, and so forth. Different channels of consumption may result in entirely different outcomes of digital marketing content, and thus are important metrics to include when analyzing the success of the digital marketing content and individual components of items of digital marketing content.

Figure 5:
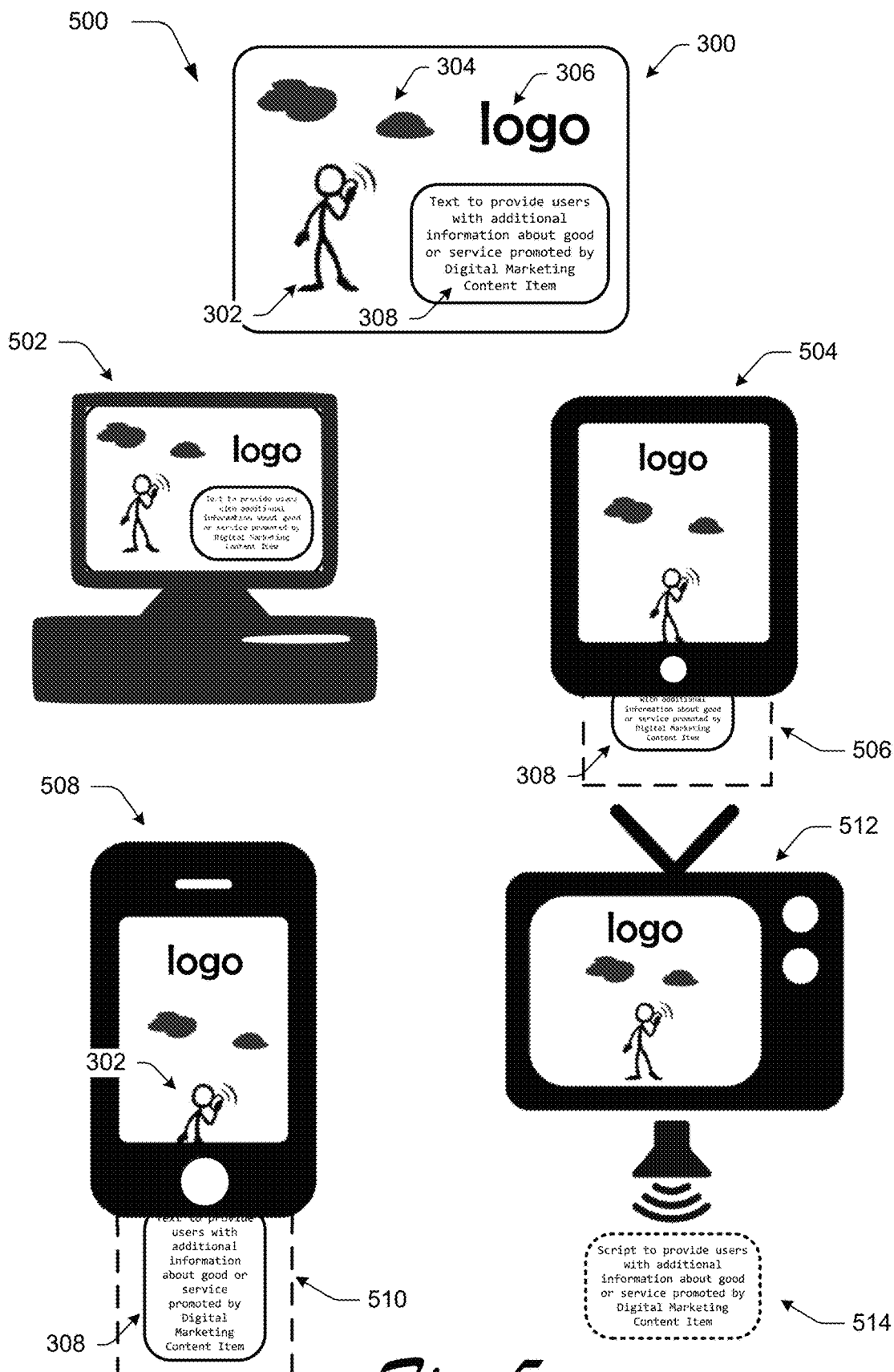
FIG. 5 depicts an example implementation showing different channels in which items of digital marketing content may be consumed by members of an audience.

For example, consider FIG. 5, which depicts an example implementation 500 showing different channels in which items of digital marketing content may be consumed by members of an audience. The digital marketing content item 300 of FIG. 3 is shown, with components 302, 304, 306, and 308 in its original form, e.g., as created by a digital media designer. In this form, the digital media designer created the digital marketing content item 300 having components with dimensions to be displayed on a desktop computer screen, such as using the desktop computer 502.

While the size of the components 302, 304, 306, and 308 may vary in size to accommodate different desktop computer screens as part of the digital marketing content item 300, the size ratio from one component to another, and the layout of the components, remains generally the same between desktop computer monitors. With this in mind, the components 302, 304, 306, and 308 can be sized and arranged by the analytics system 106 to generate a layout to achieve a desired effect on user interaction with the digital marketing content item 300 and cause a particular action when users view the digital marketing content item on a desktop computer.

The digital marketing content item 300 may also be displayed on other devices having different dimensions than a desktop computer, however, and thus the components 302, 304, 306, and 308 may need to be resized and/or rearranged to accommodate these other devices. The components 302, 304, 306, and 308 of the digital marketing content item 300 may be resized and/or rearranged as part of the design process by the digital media designer. Alternatively or additionally, the components 302, 304, 306, and 308 may be automatically resized and/or rearranged by the analytics system 106 based on user interaction data 116 for the particular digital marketing content item 300 and channel where the digital marketing content item will be displayed.

For example, a tablet device 504 is shown displaying the digital marketing content item 300 having the components 302, 304, 306, and 308. However, the components 302, 304, 306, and 308 have been rearranged and resized to accommodate the form factor and display dimensions of the tablet 504. In this example, the components 302, 304, 306, and 308 are rearranged and resized to individually take up a larger percentage of the display screen than when displayed on the desktop computer 502.

To accommodate the larger percentage of the display screen taken up by the individual components 302, 304, 306, and 308, a user may need to scroll to view the entire digital marketing content item 300. In this case, the text box 308 is not viewable on the current display of the tablet 504, but is shown in a representation 506 of the digital marketing content item 300 that is not currently viewable on the display of the tablet. When viewing the digital marketing content item 300 on the tablet 504, a user may scroll down to view the text box 308. This particular layout of components on the tablet 504 is determined by the analytics system 106 to achieve a desired effect on user interaction with the digital marketing content item 300 and cause a particular action when users view the digital marketing content item on the tablet.

In another example, a mobile device 508 is shown displaying the digital marketing content item 300 having the components 302, 304, 306, and 308. Again, the components 302, 304, 306, and 308 have been rearranged and resized to accommodate the form factor and display dimensions of the mobile device 508. In this example, the components 302, 304, 306, and 308 are rearranged and resized to individually take up a larger percentage of the display screen than when displayed on the tablet 504.

Once again, a user may need to scroll to view the entire digital marketing content item 300 to accommodate the larger percentage of the display screen taken up by the individual components 302, 304, 306, and 308. A portion of the digital image 302 and the text box 308 are not viewable on the current display of the mobile device 508, but extend into a representation 510 of the digital marketing content item 300 that is not currently viewable on the display of the tablet. When viewing the digital marketing content item 300 on the mobile device 508, a user may scroll down to view the rest of the digital image 302 and the text box 308. This particular layout of components on the mobile device 508 is determined by the analytics system 106 to achieve a desired effect on user interaction with the digital marketing content item 300 and cause a particular action when users view the digital marketing content item on the mobile device 508.

In yet another example, a television 512 is shown displaying the digital marketing content item 300 having the components 302, 304, 306, and 308. Once again, the components 302, 304, 306, and 308 have been rearranged and resized to accommodate the form factor and display dimensions of the television 512. In this example, the components 302, 304, and 306 are rearranged and resized to individually take up a larger percentage of the display screen than when displayed on the desktop computer 502. Further, the text box 308 has been removed from the digital marketing content item 300.

The analytics system 106 has removed the text box 308 based on user interaction data 116 indicating that including the text box in a television content item does not achieve a desired effect on user interaction to achieve a particular action. Instead, the analytics system 106 has generated a script 514 representing the information included in the text box 308 that is played as audio through speakers of the television 512. Both the particular layout of components, and the script 514 representing the information included in the text box 308, are determined by the analytics system 106 to achieve a desired effect on user interaction with the digital marketing content item 300 and cause a particular action when users view the digital marketing content item on the television 512.

Returning to a discussion of FIG. 2, the consumption module 208 generates channel data 216 as part of the consumption data 216 for different channels of consumption, such as the desktop computer 502, tablet 504, mobile device 508, and television 512. The channel data 216 can relate to which audience members or segments of an audience are most likely to use a particular channel for digital content, how altering different components as displayed on the different channels affects performance of an action, which channel is most effective at achieving a particular action, a most popular channel of consumption, and so forth.

An outcome module 218 receives the consumption data 210 and generates outcome data 220 for the audience. The outcome data 220 describes whether the effect of user interaction likely resulted from the individual components of the items of digital marketing content, multiple segments indicated in the segment data, an environment, and/or a channel indicated in the consumption data. Individual components within an item of digital marketing content may combine with any combination of a segment, an environment, and/or a channel to have an effect on achieving an action. Information supplied in the outcome data 220 provide insight as to which components of items of digital marketing content work or do not work for a particular audience or audience segment, in a particular environment of consumption, and/or delivered via a particular channel. This information can then be used to generate more effective digital content either by content creators or automatically by the analytics system 106 itself.

In another example, the outcome module 218 identifies a same or similar component or attribute that had similar outcomes in different digital marketing campaigns. As an illustration, a digital image component of a smiling baby used to sell both baby products and life insurance may be successful in both digital marketing campaigns, even though the two digital marketing campaigns are otherwise unrelated to one another. The outcome module 218 can include information on the particular digital marketing campaigns in the outcome data 220 indicating that the component had a corresponding effect on achieving the action.

To provide a better understanding of how the consumption data 210 provides insight into the effect of user interaction on achieving an action, consider the following examples. In a first example, the outcome module 218 identifies that users who consumed an item of digital marketing content having a particular vector artwork component at home, in the evening, and on a tablet viewed the item of digital marketing content the longest and were the most likely to purchase a good or service offered in the item of digital marketing content, regardless of audience segment. In a second example, the outcome module 218 identifies that users in an audience segment comprised of females located in the North West region of the United States, who received an item of digital marketing content having a particular video component, and consumed the item of digital marketing content while at work navigated the largest number of pages of a website and were the most likely to purchase a good or service offered in the item of digital marketing content, regardless of the channel of consumption. In a third example, the outcome module 218 identifies that users in an audience segment comprised of teenage boys, who received an item of digital marketing content with text component in a cursive font, and consumed the item of digital marketing content on a mobile device had the highest bounce rate and were the least likely to purchase a good or service offered in the item of digital marketing content, regardless of the environment of consumption.

The outcome module 218 outputs the outcome data 220 to a result output module 222. The result output module 222 outputs the outcome data 220, leveraging the outcome data in a variety of ways, such as by load balancing of computational resources, targeting of digital marketing content, content search results, and so forth. The outcome data 220, for instance, may be leveraged automatically and without user intervention by the analytics system 106 or output in a user interface 224 by a user interface module 226, e.g., as a notification, in real time during user interaction with the usage data, as a search result input in the user interface, and so forth. Additionally, the outcome data 220 is output to the service manager module 110 of the service provider system 102 to store the determined effects of the components on audience segments, environments, and/or channels on the outcome of the items of digital marketing content. In this way, a record of the success of the different components on audience segments, environments, and/or channels can be leveraged by content creators, marketing professionals, or the analytics system itself for future digital marketing campaigns.

Figure 6:
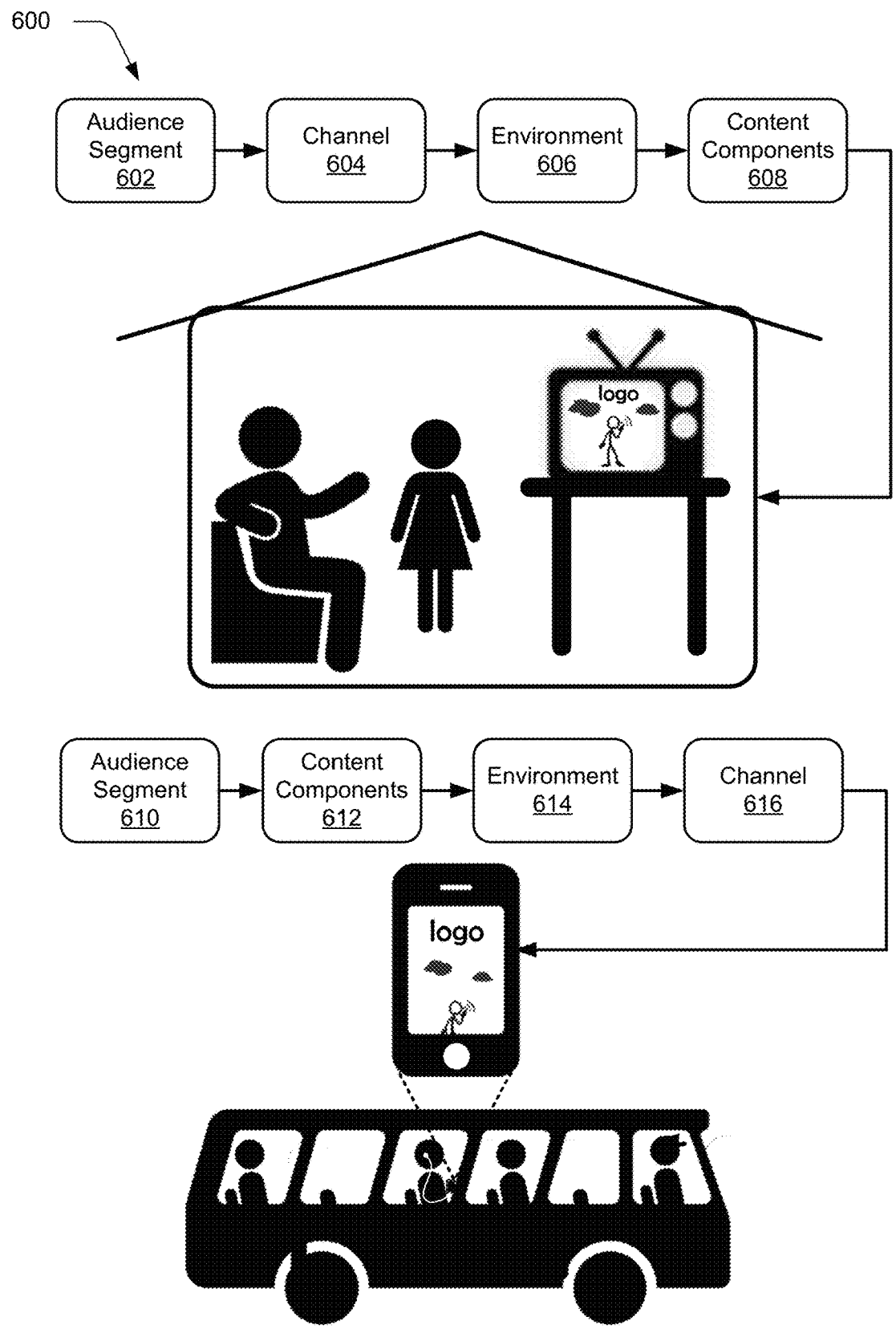
FIG. 6 depicts an example implementation of real-time generation of items of digital marketing content based on an audience segment combined with content components, an environment of consumption, and a channel of consumption.

For instance, the outcome data 220 may be leveraged by the analytics system 106 to generate items of digital marketing content having particular components on-the-fly, in real time, based on conditions surrounding the delivery of an item of digital marketing content. For example, consider FIG. 6, which depicts an example implementation 600 of real-time generation of items of digital marketing content having particular components based on an audience segment, an environment of consumption, and a channel of consumption. While the audience segment, environment of consumption, and channel of consumption are all depicted in the examples of FIG. 6, any subsets of these aspects may be used in real-time generation of items of digital marketing content having particular components in any combination.

In a first example, the analytics system 106 identifies an audience segment 602 from the outcome data 220 that is going to, or is likely to, consume an item of digital marketing content. The audience segment 602 in this example is a male between the ages of 36 and 45 who lives in a suburban area. The analytics system 106 then identifies a channel 604 of consumption of the item of digital marketing content from the outcome data 220. The channel 604 of consumption in this example is a smart television, thus having a relatively large display area, with viewers sitting far from the display. The analytics system 106 identifies an environment 606 of consumption of the item of digital marketing content from the outcome data 220. The environment 606 of consumption in this example is at home, on a weekend morning, with the user's child. Finally, the analytics system 106 sources a number of content components 608 which are most likely to achieve a desired action, and includes the content components in an automatically-generated item of digital marketing content to deliver to the user. The analytics system 106 selects the particular content components 608 based on the audience segment 602, the channel 604 of consumption, and the environment 606 of consumption, and assembles these components into a single item of digital marketing content customized for the user.

In a second example, the analytics system 106 identifies an audience segment 610 from the outcome data 220 that is going to, or is likely to, consume an item of digital marketing content. The audience segment 610 in this example is a male between the ages of 18 and 24 who lives in an urban area. Knowing that the audience segment 610 is substantially determinative of what components should be included in a particular item of digital marketing content in this example, the analytics system 106 sources content components 612 to include in the item of digital marketing content. The analytics system 106 then identifies an environment 614 of consumption of the item of digital marketing content from the outcome data 220. The environment 614 of consumption in this example is on a public bus, on a public network, during a morning commute, and around strangers. The analytics system 106 then identifies a channel 616 of consumption of the item of digital marketing content from the outcome data 220. The channel 616 of consumption in this example is a mobile device, thus having a relatively small display area, with viewers sitting close to the display. Finally, the analytics system 106 arranges the content components 612 which are most likely to achieve a desired action in an automatically-generated item of digital marketing content to deliver to the user. The analytics system 106 can, for example, resize, rearrange, or select a subset of the content components 612 based on the subsequently-identified environment 614 of consumption and channel 616 of consumption, and assembles these components into a single item of digital marketing content customized for the user. The outcome data 220 may be leveraged by the analytics system 106 to automatically generate recommendations and/or additional items of digital marketing content in a variety of ways, an example of which is described as follows.

Figure 7:
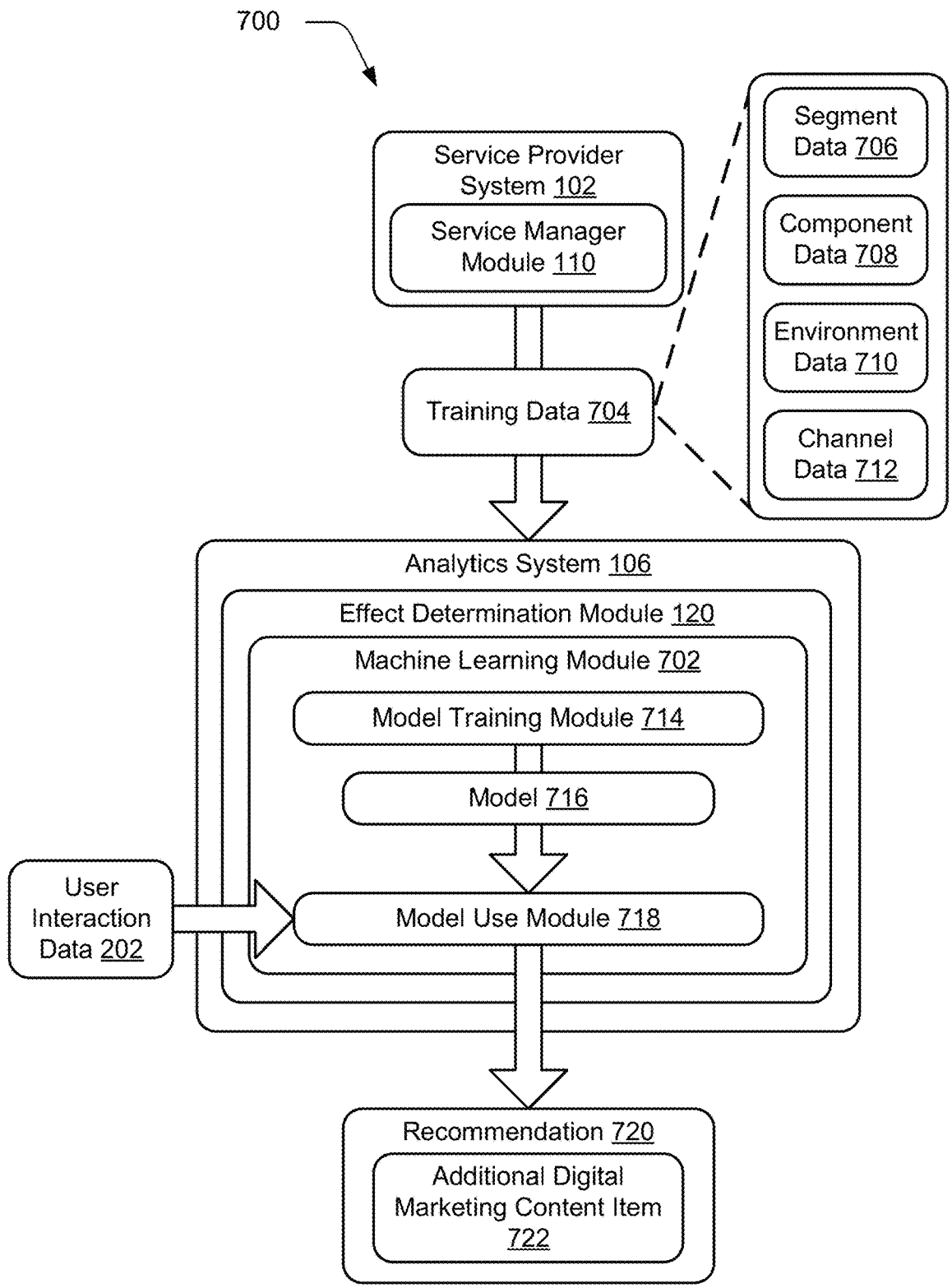
FIG. 7 depicts an example implementation showing operation of the analytics system of FIG. 1 in greater detail as employing machine learning to generate recommendations for items of digital marketing content.

FIG. 7 depicts an example implementation 700 showing operation of the analytics system 106 in greater detail as employing machine learning to generate recommendations for items of digital marketing content. In this example, the effect determination module 120 includes a machine learning module 702 that is configured to employ machine learning (e.g., a neural network) using training data 704 to generate a model 716. The training data 704 may be obtained from a variety of sources, such as from the service manager module 110 of the service provider system 102. The service provider system 102, for instance, may obtain client interaction data 114 from one or more client devices 104(b) (not pictured in FIG. 7) which may be used as part of the training data 704.

The training data 704 is configured to describe user interaction with items of digital marketing content as described above and below. Further, this training data 704 also identifies components included in these items. To do so, the training data 704 may describe a variety of characteristics involving consumption of items of digital marketing content. Illustrated examples of characteristics described by the training data 704 involving user interaction include segment data 706 (e.g., user demographics), component data 708 (e.g., intrinsic attributes and/or attached attributes), environment data 710 (e.g., location, network, and/or surroundings during consumption), channel data 712 (e.g., mobile device, television, and so forth), and so on.

All or a variety of combinations of the training data 704 is provided to the analytics system 106 in this example. The effect determination module 120 then employs the machine learning module 702 having a model training module 714 to train the model 716 using machine learning. A variety of types of machine learning techniques may be employed, such as linear regression, logistic regression, decision trees, structured vector machines, naïve Bayes, K-means, K-nearest neighbor, random forest, neural networks, and so forth. The effect determination module 120 also includes a model use module 718 to employ the model 716 to process the user interaction data 202 to generate a recommendation 720. The recommendation 720 may be configured in a variety of ways based on the training data 704 used to train the model 716 to support a wide range of functionality. In one example, the recommendation 720 includes an additional digital marketing content item 722 that is generated based on the user interaction data 202 and using the model 716 to deliver digital content in real time to the right audience, containing the right components, in the right environment, and through the right channels as described above and below.

The outcome data 220 may further be included by the analytics system 106 as part of a content graph that aggregates information about an item of digital marketing content and connects users, content, and attributes in a single location. For example, consider FIG. 8, which depicts an environment 800 including operation of an analytics system configured to generate a content graph connecting users, content, and attributes for an item of digital marketing content. To begin, a project manager 802 has an idea to generate brand awareness as part of a digital marketing campaign 804 for a product produced by the project manager's company. The project manager 802 commissions a content creator 806 to generate a digital marketing content item 808 for the project manager's digital marketing campaign.

When the content creator 806 creates the digital marketing content item 808, the analytics system generates a content graph 810, which includes a variety of information about the digital marketing content item. For example, the content graph 810 associates both attached and intrinsic attributes to the digital marketing content item, and individual components within the digital marketing content item. Intrinsic attributes are attributes of components of a digital marketing content item that are inherent to the components themselves, such as size, color, and location within the digital marketing content item. Attached attributes are attributes that associate a user or application to a digital marketing content item or component in the digital marketing content item, such as author, producer, sound editor, audience members who performed an action on the item of digital content, and so forth. Conventional systems often lose track of attached attributes, such as when the digital marketing content item is saved by another user (thus erasing the original creator of the digital content item) or transferred in file management operations, to name a few examples. Therefore, conventional systems leave users without information regarding who or what created various components of a digital marketing content item, and whether the creators were successful or unsuccessful at producing a particular outcome.

The content graph 810 can be stored as part of the digital marketing campaign 804, so that users with access to the digital marketing campaign can access the digital marketing content item 808 along with relevant attached and intrinsic attributes if desired. At this stage, the content graph 810 includes attached attributes such as the project manager 802 who commissioned the digital marketing content item 808, the content creator 806, and can also include information on other items of digital marketing content in the digital marketing campaign and how the other items are related to the digital marketing content item 808.

After the digital marketing item 808 is created, users with access to the digital marketing campaign 804 may wish to use the digital marketing content item in different scenarios. For instance, a marketer 812 uses the digital marketing content item 808 as part of a sub-campaign 814 to advertise the product, such as in an online channel 816 and displayed in a public transportation channel 818. The content graph 810 incorporates attached attributes indicating the marketer 812 who used the digital marketing content item 808, the sub-campaign 814 that the digital marketing content item was used in, and the channels 816 and 818 that were used to deliver the digital marketing content item to its audience. The content graph 810 includes information on what version of the digital marketing content item 808 is used and when in the sub-campaign 814, so that analytics systems and future users know the exact digital marketing content item that produced particular outcomes and metrics related to those outcomes.

Additionally, another content creator 820 may use the digital marketing content item 808 as a basis to create a modified digital marketing content item 822. The modified digital marketing content item 822 is incorporated into the content graph 810, with an indication of how the two digital marketing content items 808 and 822 are related to one another. Further, information on the other content creator 820 is included in the content graph 810 to record who made the changes to the digital marketing content item 808. Information on the other content creator 820 and how the other content creator changed the digital marketing content item 808 to create the modified digital marketing content item 822 provide insight on whether the original content or the modified content was more successful at producing particular outcomes and metrics related to those outcomes.

For example, the modified digital marketing content item 822 is displayed on a social media platform, where users 824, 826, and 828 all "like" the modified digital content item. A record of these "likes", along with information about the users 824, 826, and 828, are incorporated into the content graph 810. The information about the users 824, 826, and 828 may be used by the analytics system to generate outcome data for metrics regarding types of users that responded positively to the modified digital marketing content item 822. Data on the users 824, 826, and 828 responses to the modified digital marketing content item 822 can then be compared with data on responses or outcomes of other users to the digital marketing content item 808. Comparison of the two digital marketing content items 808 and 822 can be used to determine a likely effect of different components of the two digital marketing content items, such as which audience segments had a more positive or negative experience with the two digital marketing content items, which channels of consumption of the two digital marketing content items had the greatest effect on outcomes of the digital marketing content items across audience segments, which environments of consumption of the two digital marketing content items had the greatest effect on outcomes of the digital marketing content items across audience segments, and so forth.

Furthermore, both intrinsic attributes and attached attributes of a digital marketing content item can be included in a content graph that connects users, content, and attributes to one another. Connections in a content graph can be analyzed to understand what aspects of a digital marketing content item produced particular outcomes and additional metrics related to those outcomes as described above and below. In particular, both intrinsic and attached attributes can be included in a content graph for individual components of a digital marketing content item, which can provide valuable insight to project managers, content creators, marketers, data analysts, or any other users involved with a digital marketing campaign.

Additionally, the content graph 810 includes relationships of content, attributes, and users across multiple digital marketing campaigns. For example, a font attribute may result in a successful outcome in a particular audience segment regardless of the digital marketing campaign in which the font is used. In another example, a color scheme may result in a successful outcome at a particular time of year, regardless of the digital marketing campaign in which the color scheme is used. In yet another example, a photographer (e.g., included as an attached attribute) may result in a successful outcome for a particular category of product, even if individual products in the category have independent digital marketing campaigns. By including relationships of content, attributes, and users across multiple digital marketing campaigns in the content graph 810, the content graph can be used to capture variation both within a campaign and across campaigns, and consequently provide more accurate and useful recommendations.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
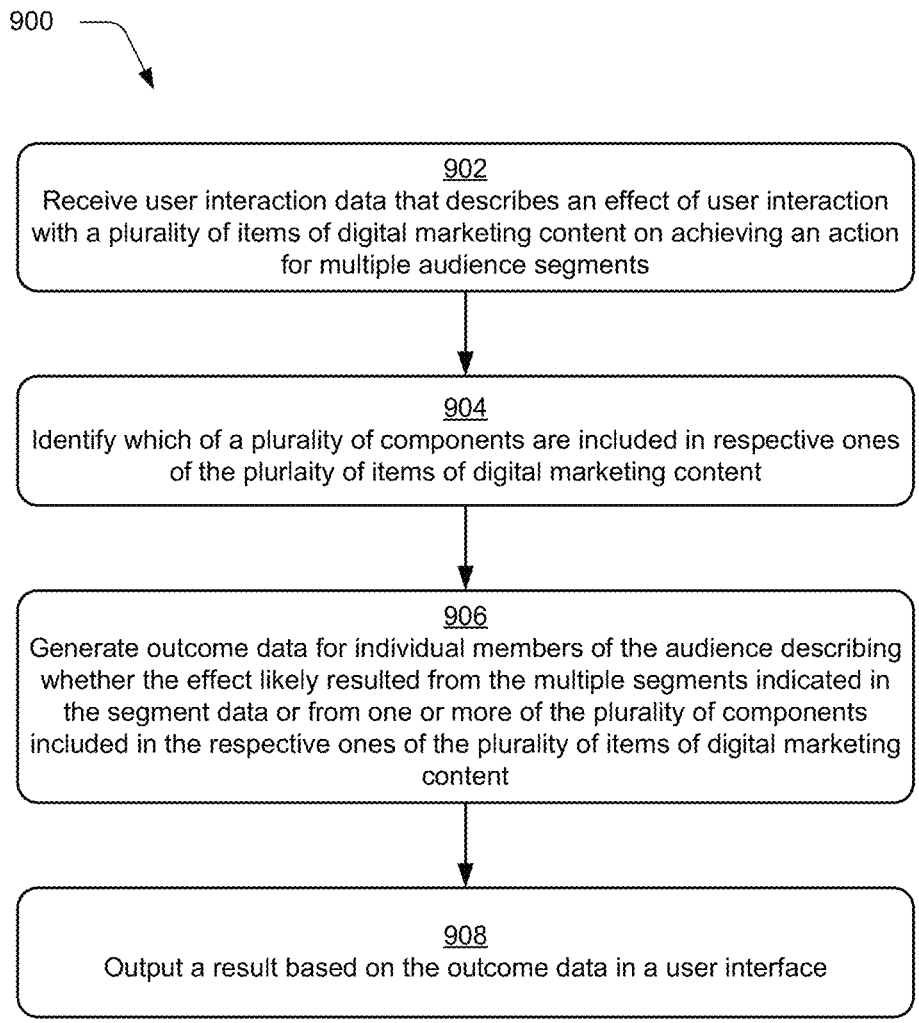
FIG. 9 is a flow diagram depicting a procedure in an example implementation in which a digital marketing content system is optimized to analyze audience segments and components of digital content in a digital marketing campaign.

FIG. 9 depicts a procedure 900 in an example implementation in which a digital marketing content system is optimized to analyze audience segments and components of digital content in a digital marketing campaign. To begin, user interaction data that describes an effect of user interaction with a plurality of items of digital marketing content on achieving an action is received for multiple audience segments (block 902). The items of digital marketing content may be any form of digital content used in a digital marketing campaign, and are each made up of a plurality of components that may include text, photographs, vector artwork, digital images, 3D objects, haptic outputs, audio, and/or video. The components in turn may include attributes such as color, size, location in the content item, duration of display, content creator, objects, activities, and so forth. Audience segments are subsets of an audience having homogeneous characteristics. The characteristics used to indicate the segments may include defined criterion in categories such as product usage, demographics, psychographics, communication behaviors and media use, to name a few examples.

A plurality of components are identified as included in respective ones of the plurality of items of digital marketing content (block 904). The consumption module 208 can identify the plurality of components using a variety of techniques, such as analyzing metadata associated with the digital marketing content item, object recognition techniques for visual content, and/or speech or music recognition for audio content, to name a few examples. Additionally, the consumption module 208 can identify one or more attributes (e.g., intrinsic attributes or attached attributes as described above) of the plurality of components included in the respective items of digital marketing content.

Outcome data is generated for individual members of the audience describing whether the effect likely resulted from the multiple segments indicated in the segment data, or from the components in the respective items of digital marketing content (block 906). The outcome module 218, for instance, identifies a particular audience segment or digital marketing content item component that resulted in the effect on achieving the action, and include this information in the outcome data 220. Additionally, the outcome module 208 can include information in the outcome data 220 relating to how the different components had varying effects on the different segments at achieving the action.

A result is output based on the outcome data in a user interface (block 908). In one example, a result indicated in the outcome data 220 is leveraged automatically and without user intervention for output in the user interface 224, e.g., as a notification, in real time during user interaction with the usage data, as a search result input in the user interface, and so forth. Alternatively or additionally, a result indicated in the outcome data 220 may be leveraged by the analytics system 106 to select or generate items of digital marketing content having particular components on-the-fly, in real time, based on conditions surrounding the delivery of an item of digital marketing content.

Figure 10:
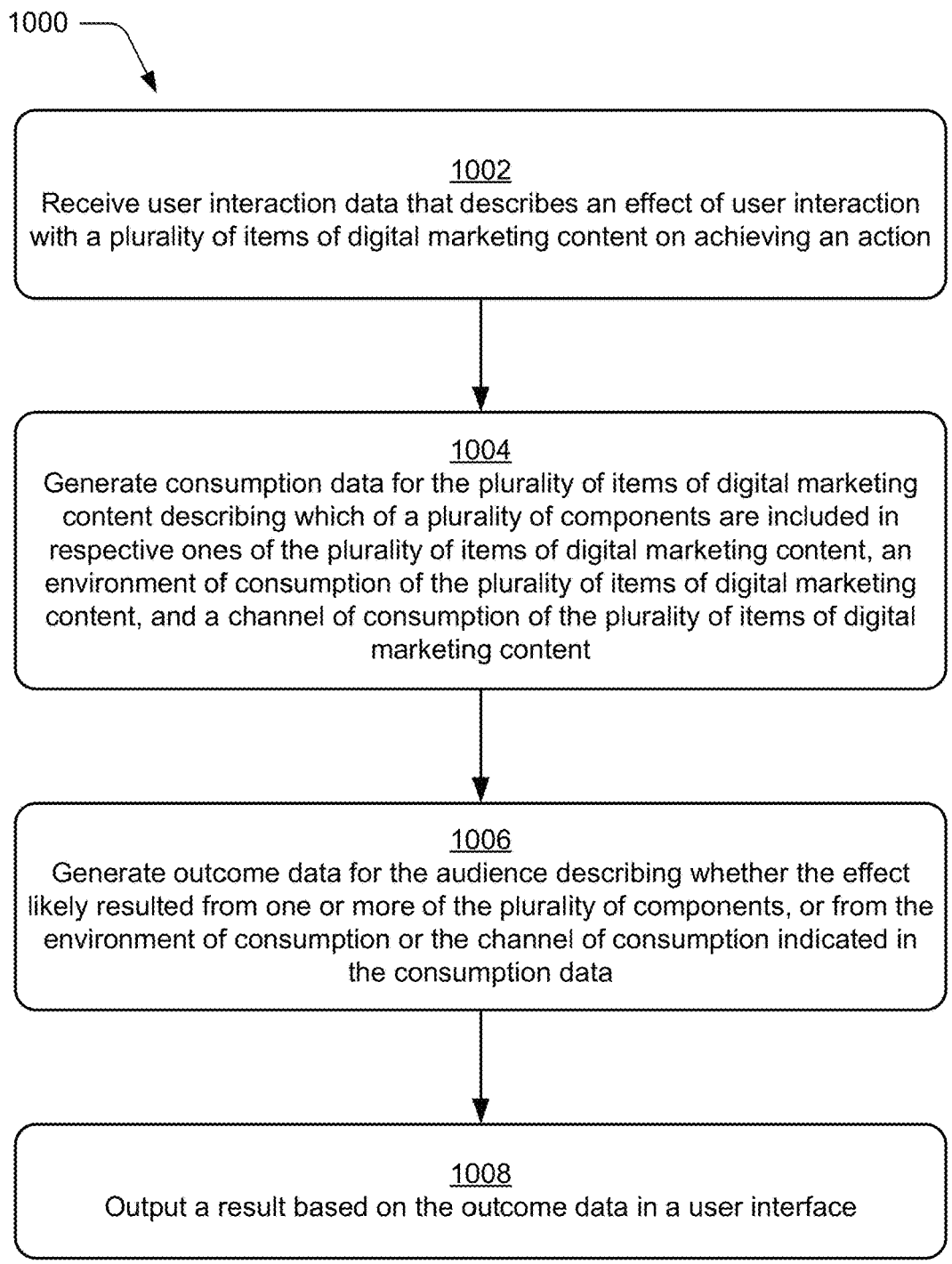
FIG. 10 is a flow diagram depicting a procedure in an example implementation in which a digital marketing content system is optimized to analyze audience segments, environments of consumption, and channels of consumption of digital content in a digital marketing campaign.

FIG. 10 depicts a procedure 1000 in an example implementation in which a digital marketing content system is optimized to analyze components of digital content with respect to audience segments, environments of consumption, and/or channels of consumption in a digital marketing campaign. To begin, user interaction data that describes an effect of user interaction with a plurality of items of digital marketing content on achieving an action is received (block 1002). As discussed above, items of digital marketing content may be any form of digital content used in a digital marketing campaign, and are each made up of a plurality of components that may include text, photographs, vector artwork, digital images, 3D objects, haptic outputs, audio, and/or video. The components in turn may include attributes such as color, size, location in the content item, duration of display, content creator, objects, activities, and so forth.

Consumption data for the plurality of items of digital marketing content is generated (block 1004). The consumption data describes which of a plurality of components are included in respective ones of the plurality of items of digital marketing content. The consumption data further describes an environment of consumption and a channel of consumption of the plurality of items of digital marketing content. As discussed above, the environment refers to a place, time, with whom, and possibly why a user consumes the digital marketing content. The environment data 214 may include location data that describes a location of a user who is consuming digital content within which a digital marketing content item may be consumed. The environment data 214 may also include network data indicating a network that a user is using to send and receive information. Further, the environment data may include surroundings data indicating persons, places, or things in the proximity of a user that may be relevant to content displayed by a device.

The channel refers to a technique or device by which a user consumes digital marketing content. The channel data 216 can relate to which audience members or segments of an audience are most likely to use a particular channel for digital content, how altering different components as displayed on the different channels affects performance of an action, which channel is most effective at achieving a particular action, a most popular channel of consumption, and so forth.

Outcome data is generated for the audience describing whether the effect likely resulted from one or more of the plurality of components, or from the environment or channel of consumption indicated in the consumption data (block 1006). Additionally, the outcome module 218 may include a likely effect of individual components and/or attributes of components in the outcome data 220. Any combination of a segment, an environment, and/or a channel may have an effect on one or more of the components included in an item of digital marketing content on achieving an action. Information supplied in the outcome data 220 provides insight as to what components of digital content work or do not work for a particular audience or audience segment, what components work or do not work in a particular environment, what components work or do not work when delivered via a particular channel, and so forth. This information can then be used to generate more effective digital content either by content creators or automatically by the analytics system 106 itself.

A result is output based on the outcome data in a user interface (block 1008). Similar to the discussion above, a result indicated in the outcome data 220 may be leveraged automatically and without user intervention for output in the user interface 224, e.g., as a notification, in real time during user interaction with the usage data, as a search result input in the user interface, and so forth. Alternatively or additionally, a result indicated in the outcome data 220 may be leveraged by the analytics system 106 to select or generate items of digital marketing content having particular components on-the-fly, in real time, based on conditions surrounding the delivery of an item of digital marketing content. For example, the result output module 218 generates an additional digital marketing content item in real time based on the outcome data 220 responsive to the receipt of the user interaction data from one or more user devices.

Example System and Device

Figure 11:
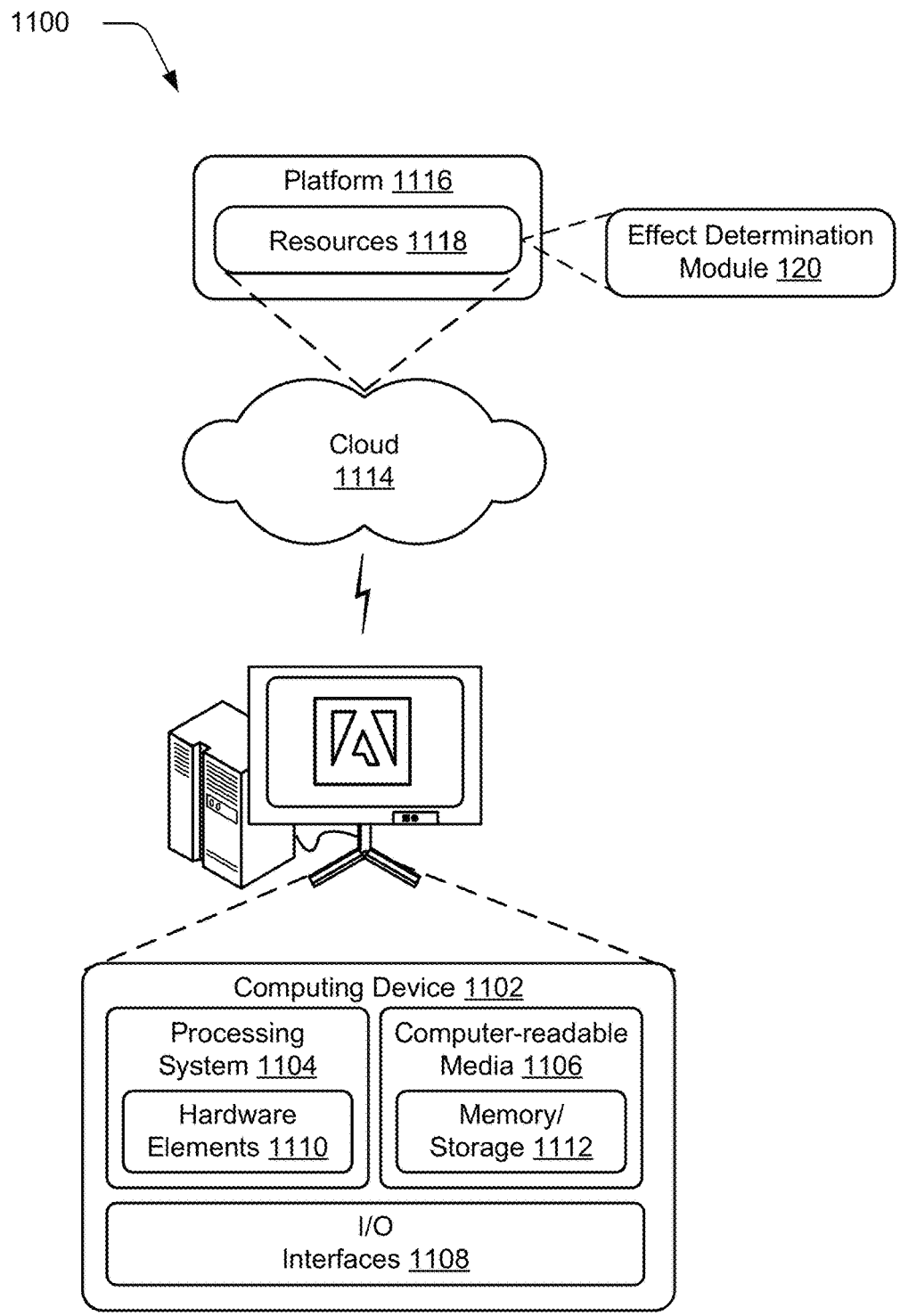
FIG. 11 illustrates an example system including various components of an example device that can be implemented as any type of computing device as described and/or utilized with reference to FIGS. 1-9 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the effect determination module 120. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   a model training model implemented at least partially in hardware of a computing device to train a model as a neural network using machine learning, based on training data, to identify which aspects of a plurality of aspects contribute toward achieving an action by a segment of a plurality of segments of an audience, the training data including:
   a first aspect identifying which of a plurality of digital images that are viewable in a user interface and make up respective ones of a plurality of items of digital content; and
   a second aspect identifying respective attributes of a plurality of attributes of the respective ones of the plurality of digital images, the plurality of attributes defining a layout, respectively, of locations of the digital images with respect to each other within the respective ones of the plurality of items of digital content; and
   a model use module implemented at least partially in hardware of the computing device to process user interaction data to generate a recommendation based on the trained model using machine learning, the recommendation indicating contributions of the first aspect and the second aspect toward achieving the action for the segment of the plurality of segments of the audience.

2. The system as described in claim 1, wherein the training data includes a third aspect describing a respective physical or online environment of a plurality of physical or online environments.

3. The system as described in claim 2, wherein the plurality of physical environments describe a user location, user surroundings, or a physical device used to consume at least one of the plurality of items of digital content.

4. The system as described in claim 1, further comprising an outcome module configured to generate outcome data based on the recommendation describing how different layouts of the plurality of digital images affect different segments of the audience on achieving the action based on the user interaction data.

5. The system as described in claim 4, further comprising a result output module to output a result based on the recommendation.

6. The system as described in claim 5, wherein the result output module is further configured to generate the result in real time based on the recommendation.

7. The system as described in claim 1, wherein a fourth aspect describes layout of the plurality of digital images as included within respective ones of the plurality of items of digital content.

8. The system as described in claim 1, wherein a fourth aspect describes a size of the respective ones of the plurality of digital images as part of the respective ones of the plurality of items of digital content.

9. The system as described in claim 1, wherein the first aspect is generated using object recognition.

10. A system comprising:
    means for training a model using machine learning based on training data to identify which aspects of a plurality of aspects contribute toward achieving an action, the training data including:
    a first aspect describing which of a plurality of digital images, that are displayable in a user interface, are included in respective ones of a plurality of items of digital content, at least one said digital image shared by at least two said items of digital content; and
    a second aspect identifying respective attributes of a plurality of attributes included in respective ones of the plurality of digital images, the plurality of attributes including location of objects within respective ones of the plurality of digital images; and
    means for using the model to process user interaction data to generate a recommendation based on the trained model using machine learning, the recommendation indicating a particular said attribute of the plurality of attributes to be included in an additional item of digital content.

11. The system as described in claim 10, further comprising means for generating outcome data that further describes whether the action likely resulted from a combination of two or more of the plurality of aspects, the plurality of aspects further describing a third aspect describing which audience segment of a plurality of audience segments consume, respectively, the plurality of items of digital content.

12. The system as described in claim 10, wherein the using means further comprises means for generating an additional likely effect of items of digital content on a particular segment of a plurality of audience segments based on the user interaction data.

13. The system as described in claim 10, further comprising means for generating the additional item of digital content as including the digital image of the plurality of digital images having the location of the objects in real time based on the recommendation.

14. The system as described in claim 10, further comprising means for generating outcome data that includes a content graph that connects users, content, and attributes for items of digital content in the user interaction data.

15. A method comprising:

training, by at least one computing device, a model as a neural network using machine learning based on training data to identify which aspects of a plurality of aspects contribute toward achieving an action, the training data including:

a first aspect describing which of a plurality of digital images make up respective ones of a plurality of items of digital content; and a second aspect defining layout of the digital images within the respective ones of the plurality of items of digital content; and a third aspect including location of objects within respective ones of the plurality of digital images; and generating, by the at least one computing device, a recommendation by processing user interaction data based on the trained model using machine learning, the recommendation indicating respective contributions of the first aspect, the second aspect, and the third aspect on achieving the action; and generating, by the at least one computing device, an additional item of digital content based on the recommendation.

16. The method as described in claim 15, wherein the plurality of aspects further include color or size of the respective ones of the plurality of digital images as part of the respective ones of the plurality of items of digital content.

17. The method as described in claim 15, further comprising a fourth aspect indicating a plurality of channels also describe a device used to consume at least one of the plurality of items of digital content.

18. The method as described in claim 15, further comprising generating outcome data describing how different digital images of the plurality of digital images affect different segments of a user audience on achieving the action.

19. The method as described in claim 18, wherein at least one said digital image is shared by at least two said items of digital content.

20. The method as described in claim 15, wherein the additional item of digital content is generated in real time responsive to receipt of the user interaction data.

* * * * *